(12) United States Patent
Kojima et al.

(10) Patent No.: US 7,188,190 B1
(45) Date of Patent: Mar. 6, 2007

(54) PACKET DATA PROCESSING APPARATUS AND PACKET RELAY APPARATUS

(75) Inventors: Yuji Kojima, Kawasaki (JP); Tetsumei Tsuruoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 489 days.

(21) Appl. No.: 09/587,529

(22) Filed: Jun. 1, 2000

(30) Foreign Application Priority Data

Jun. 4, 1999 (JP) .................................. 11-158514

(51) Int. Cl.
*G06F 15/16* (2006.01)
*G06F 15/173* (2006.01)

(52) U.S. Cl. ..................... 709/239; 709/229; 709/234; 709/238

(58) Field of Classification Search ................ 703/238; 370/218, 392, 394, 462, 503, 389; 365/78, 365/185.01, 189.05; 709/229, 234, 238, 709/239
See application file for complete search history.

(56) References Cited

U.S. PATENT DOCUMENTS

| | | | | |
|---|---|---|---|---|
| 4,145,686 A * | 3/1979 | McMurray et al. | ........... | 341/87 |
| 4,949,243 A * | 8/1990 | Mohamed Ali et al. | ......... | 711/5 |
| 5,076,133 A * | 12/1991 | Toda | ........................... | 84/624 |
| 5,168,463 A * | 12/1992 | Ikeda et al. | .................... | 365/78 |
| 5,206,942 A * | 4/1993 | Ibi | ........................ | 365/189.05 |
| 5,293,500 A * | 3/1994 | Ishida et al. | ................. | 712/217 |
| 5,452,250 A * | 9/1995 | Riggio, Jr. | ............. | 365/185.01 |
| 5,553,095 A * | 9/1996 | Engdahl et al. | ............. | 370/462 |
| 5,608,662 A * | 3/1997 | Large et al. | ................ | 370/394 |
| 5,732,233 A * | 3/1998 | Klim et al. | | |
| 5,933,605 A * | 8/1999 | Kawano et al. | ............. | 709/238 |
| 6,081,538 A * | 6/2000 | Donley | ........................ | 370/503 |
| 6,104,713 A * | 8/2000 | Nagami et al. | ............. | 370/392 |
| 6,519,225 B1 * | 2/2003 | Angle et al. | ................. | 370/389 |
| 6,535,489 B1 * | 3/2003 | Merchant et al. | ........... | 370/218 |

FOREIGN PATENT DOCUMENTS

JP   6-266616   9/1994

* cited by examiner

*Primary Examiner*—Jason Cardone
*Assistant Examiner*—Quang N Nguyen
(74) *Attorney, Agent, or Firm*—Katten Muchin Rosenman LLP

(57) ABSTRACT

In a packet data processing apparatus for processing a packet received from a network by a processor, a packet data access part includes a plurality of registers arranged in series and sequentially shifts the received packet through the plurality of registers toward an outlet of the packet data access part in synchronization with a clock. The processor processes the received packet by accessing the packet data access part while the received packet is being shifting through the plurality of registers.

12 Claims, 17 Drawing Sheets

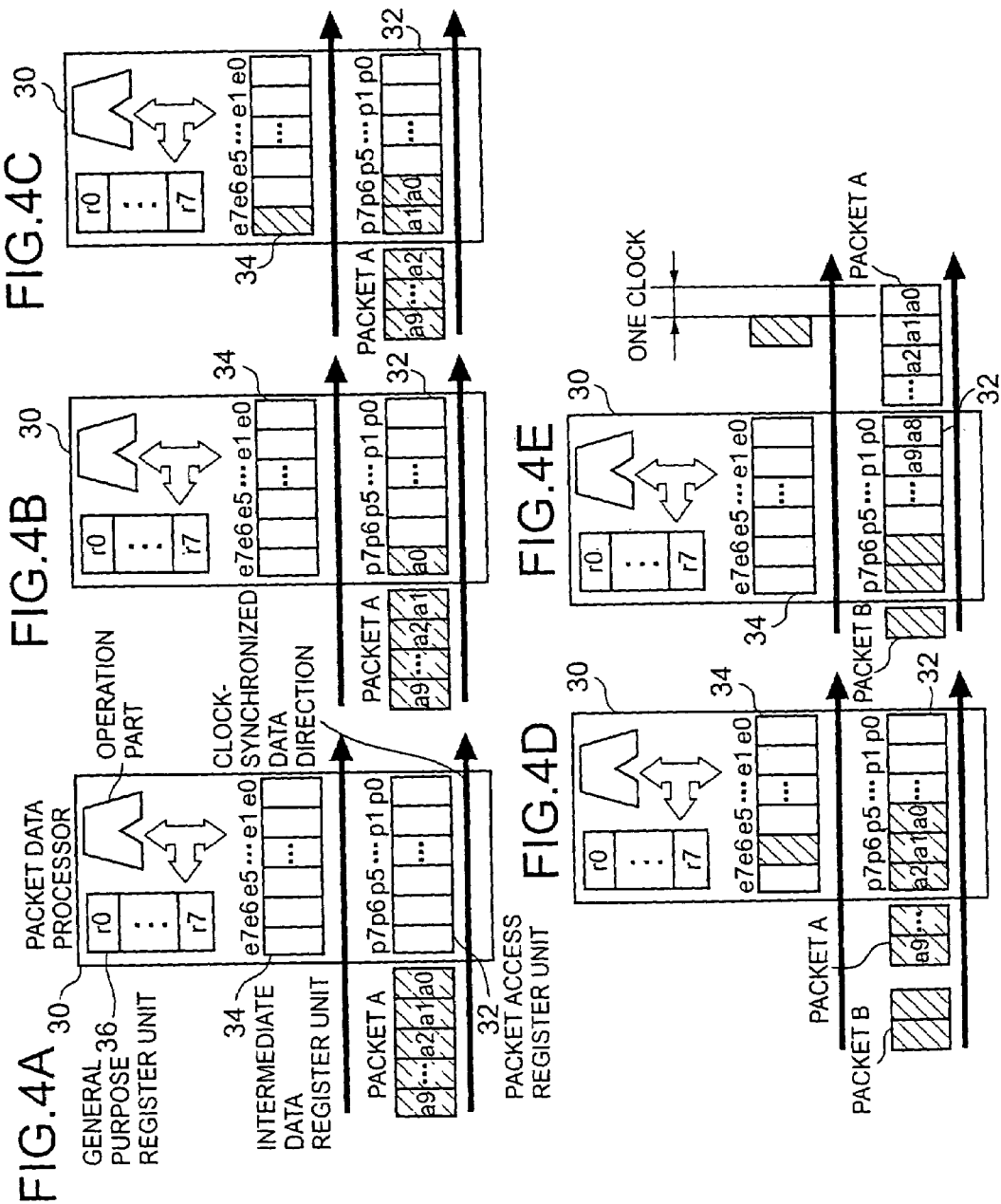

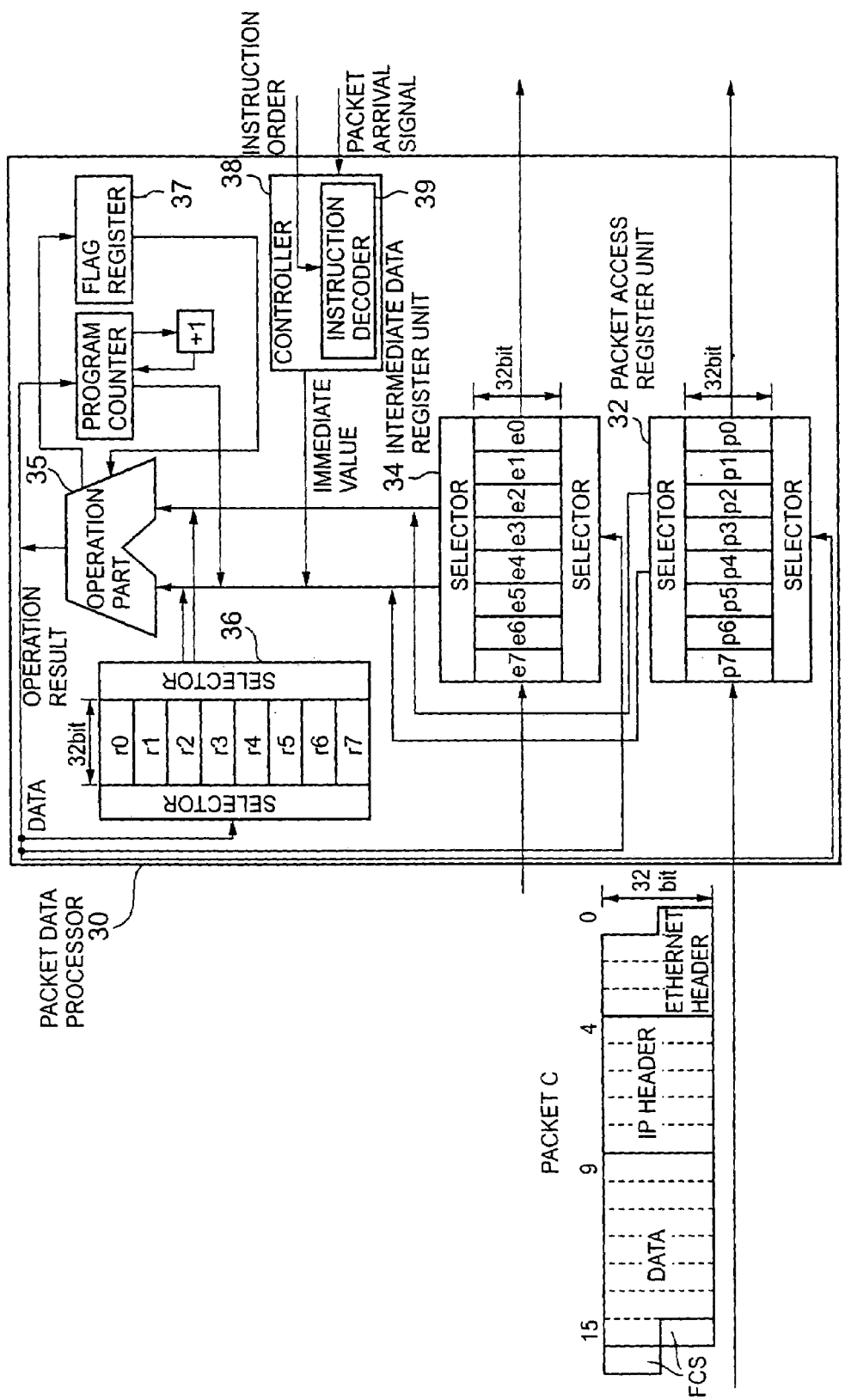

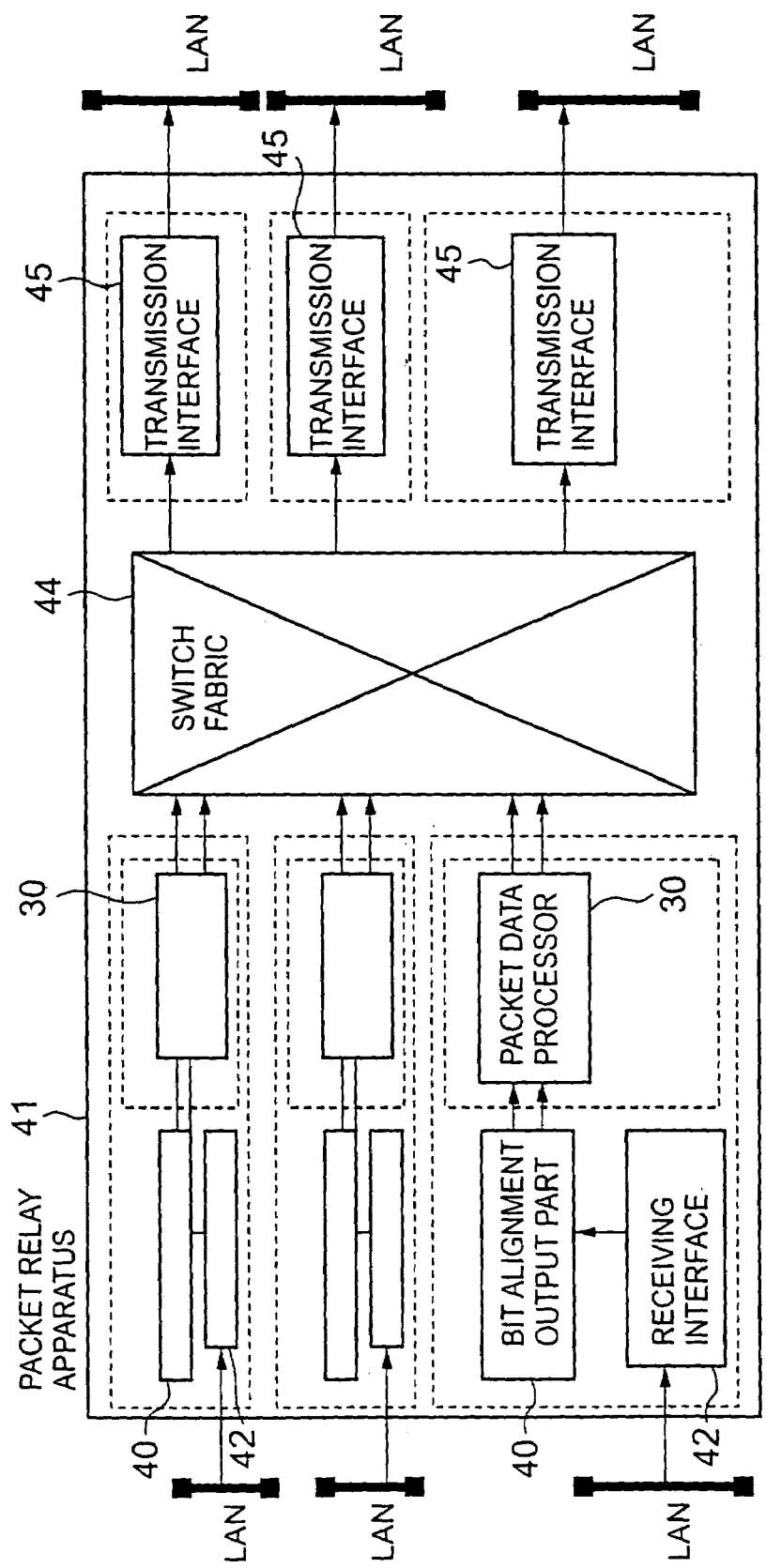

FIG. 7

| INSTRUCTION TYPE | MNEMONIC INSTRUCTION | OPERATION |
|---|---|---|
| NO OPERATION | NOP | No operation but just clock is executed |
| DATA TRANSMISSION | MOVE | Move word between registers or memories |
| | MOVW | Move lower word (lower bits) between registers |
| | MOVB | Move lower byte (lower bits) between registers |
| ARITHMETIC OPERATION | ADD | Add word integers |
| | ADC | Add carry and word integer |
| | ADW | Add lower word |
| | AWC | Add lower word and carry |
| | SUB | Subtract word integer |
| | SBW | Subtract lower word |
| LOGICAL OPERATION | OR | OR operation of word |
| | AND | AND operation of word |
| | XOR | Exclusive-OR operation of word |
| | NOT | NOT (inverse) operation of word |
| | NTW | NOT (inverse) operation of lower word and no operation of upper word |
| | NTB | NOT (inverse) operation by byte |
| | SFL | Shift left to upper byte and fill 0 to lower byte |
| | ROTL | Rotate to left |
| | SFR | Shift right to lower byte and fill 0 to upper byte |
| | ROTR | Rotate to right |
| BIT OPERATION | BSF | Get first bit '1' position from lower most bit of source operand |
| | BSR | Get first bit '1' position from upper most bit of source operand |
| | BT | Offset bit of source operand 2 based on source operand 1. Set result bit to carry flag of flag register. |

FIG. 8

| ORDER NUMBER | INSTRUCTION | SECTION WHICH OF PACKET C IS STORED IN PACKET ACCESS REGISTER UNIT | | | | | | | |
|---|---|---|---|---|---|---|---|---|---|
| | | p7 | p6 | p5 | p4 | p3 | p2 | p1 | p0 |
| 1 | ANOP | c0 | | | | | | | |
| 2 | ANOP | c1 | c0 | | | | | | |
| 3 | ANOP | c2 | c1 | c0 | | | | | |
| 4 | ANOP | c3 | c2 | c1 | c0 | | | | |
| 5 | AMOVE r0 p7 | c4 | c3 | c2 | c1 | c0 | | | |
| 6 | AADD r0 r0 p7 | c5 | c4 | c3 | c2 | c1 | c0 | | |
| 7 | AADC r0 r0 p7 | c6 | c5 | c4 | c3 | c2 | c1 | c0 | |
| 8 | AADC r0 r0 p7 | c7 | c6 | c5 | c4 | c3 | c2 | c1 | c0 |
| 9 | AADC r0 r0 p7 | c8 | c7 | c6 | c5 | c4 | c3 | c2 | c1 |
| 10 | AADC r0 r0 $0 | c9 | c8 | c7 | c6 | c5 | c4 | c3 | c2 |
| 11 | AMOVE r1 r0 | c10 | c9 | c8 | c7 | c6 | c5 | c4 | c3 |
| 12 | ASFR r0 r0 $16 | c11 | c10 | c9 | c8 | c7 | c6 | c5 | c4 |
| 13 | AADW r0 r0 r1 | c12 | c11 | c10 | c9 | c8 | c7 | c6 | c5 |
| 14 | ANTW r0 r0 | c13 | c12 | c11 | c10 | c9 | c8 | c7 | c6 |
| 15 | ≠MOVE e0 $1 | c14 | c13 | c12 | c11 | c10 | c9 | c8 | c7 |

FIG. 12

| SER. NO | INSTRUCTION ORDER OF PACKET DATA PROCESSOR 30A | | INSTRUCTION ORDER OF PACKET DATA PROCESSOR 30B | | INSTRUCTION ORDER OF PACKET DATA PROCESSOR 30C | |
|---|---|---|---|---|---|---|
| | ORDER NUMBER | INSTRUCTION | ORDER NUMBER | INSTRUCTION | ORDER NUMBER | INSTRUCTION |
| 1 | 1 | ANOP | | | | |
| 2 | 2 | AMOVE r1 $0 | | | | |
| 3 | 3 | ANOT r1 r1 | | | | |
| 4 | 4 | ASFR r1 r1 $24 | | | | |
| 5 | 5 | ASFR r1 p7 $16 | | | | |
| 6 | 6 | AAND r0 r0 r1 | | | | |
| 7 | 7 | ASUB r0 r0 $5 | | | | |
| 8 | 8 | <MOVE e3 $1 | | | | |
| 9 | | | 1 | ANOP | | |
| 10 | | | 2 | ANOP | | |
| 11 | | | 3 | ANOP | | |
| 12 | | | 4 | ANOP | | |
| 13 | | | 5 | AMOVE r0 p7 | | |
| 14 | | | 6 | AADD r0 r0 p7 | | |
| 15 | | | 7 | AADC r0 r0 p7 | | |
| 16 | | | 8 | AADC r0 r0 p7 | | |
| 17 | | | 9 | AADC r0 r0 p7 | 1 | ANOP |
| 18 | | | 10 | AADC r0 r0 $0 | 2 | ANOP |
| 19 | | | 11 | AMOVE r1 r0 | 3 | ANOP |
| 20 | | | 12 | ASFR r0 r0 $16 | 4 | AMOVE r3 $0 |
| 21 | | | 13 | AADW r0 r0 r1 | 5 | ANOT r3 r3 |
| 22 | | | 14 | ANTW r0 r0 | 6 | ASFR r3 r3 $8 |
| 23 | | | 15 | ≠MOVE e0 $1 | 7 | AMOVE r0 p7 |
| 24 | | | | | 8 | ASFR r1 r0 $24 |
| 25 | | | | | 9 | ASUB r1 r1 $1 |
| 26 | | | | | 10 | =MOVE e3 $1 |
| 27 | | | | | 11 | ASFL r1 r1 $24 |
| 28 | | | | | 12 | AAND r0 r0 r3 |
| 29 | | | | | 13 | AADD p0 r1 r0 |

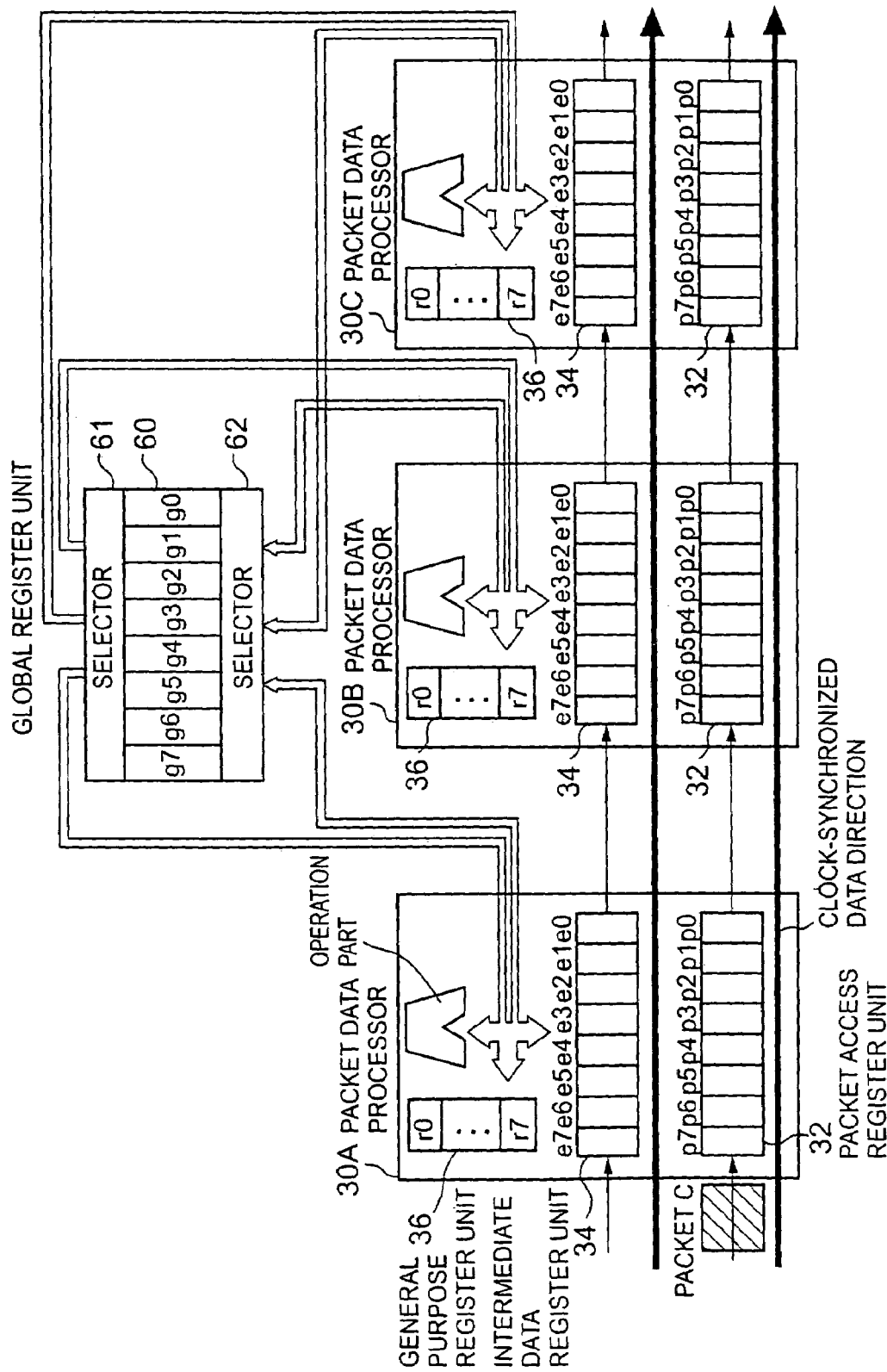

PACKET DATA PROCESSING APPARATUS AND PACKET RELAY APPARATUS

BACKGROUND OF THE INVENTION

1. Field of the Invention

The present invention generally relates to packet data processing apparatuses and packet relay apparatuses, and more particularly to the packet data processing apparatus and the packet relay apparatus using the packet data processing apparatus which is mutually connected to terminals through communication networks and which execute a packet process including a destination table searching process and a header replacing process.

2. Description of the Related Art

Recently, a communication network between terminals has been extended widely. And it is more required to link networks, for example, to mutually connect several LANs (Local Area Networks) or connect a LAN with a dedicated line, in order to extend a size of networks. Current network architecture is an IP (Internet Protocol) network. The IP is a connectionless network protocol corresponding to a network layer of an OSI (Open Systems Interconnection) reference model of the ISO (International Organization for Standardization). While a connection network protocol predetermines a communication path between terminals, a packet relay apparatus mutually connecting between LANs establishes a communication path by forwarding a packet storing communication data toward a destination in a connectionless IP network. In a relay process of the IP network, a packet process such as a destination table searching process or a header replacing process is required.

The packet process in the IP network is required to operate a checksum for a packet header, search the destination table and replace the packet header in order to relay the packet and is also required to perform a packet filtering. Conventionally, entire packet processing is executed by software since the entire packet process is too complicate to be conducted by hardware.

FIG. 1 is a diagram showing a configuration of a conventional packet relay apparatus executing the packet process by a processor. In the conventional configuration in which a processor 10 connects to a memory 11 via a bus 12 as shown in FIG. 1, the conventional packet relay apparatus executes the packet process by the processor 10 storing a packet in the memory 11 and processing the packet.

The conventional packet relay apparatus 14 shown in FIG. 2 includes the processor 10 and the memory 11 in FIG. 1. In order to forward a packet, the packet relay apparatus 14 receives the packet by a receiving interface 15 and then stores the received packet in the memory 11 temporarily. The processor 10 sends a switch fabric 16, the received packet and information which is determined as destination information and to be attached to the received packet after the processor 10 performs the checksum, searches the destination table and replaces the packet header for the received packet during the packet process.

In the packet relay apparatus 14, the packet is sent from the switch fabric 16 to a proper one of transmission interfaces 17 based on determined destination information. The packet is transmitted from the transmission interface 17. In this manner, the conventional packet relay apparatus 14 forwards the packet to the destination.

In the packet process in the packet relay apparatus, the processor 10 in FIG. 1 stores the received packet data temporarily in the memory 11 and then transfers portions of the packet data stored, which are required in accordance with instructions of a program, to a general purpose register 21. Subsequently, the processor 10 performs the packet header checksum, searches the destination table and replaces a destination address in the packet header for the packet data stored in the general purpose register 21 in accordance with an instruction order. Then, the processor 10 stores the packet data in the general purpose register 21 when it is required. After the packet data are processed, the processor 10 retrieves the packet data from the memory 11.

Referring to FIG. 1, the processor 10, which is used for the packet process including the packet header checksum, the destination table search and the destination address replacement, generally includes the general purpose register 21, for example, a single set of registers r0 to r7, to maintain data to be operated or an operation result, selectors provided with the general purpose register 21 to output and input data, an operation part 22 to execute data transmission, a comparison or an arithmetic operation based on an instruction, a controller 23 to read the instruction and send a control signal to each component provided in the processor 10, a program counter 24 to maintain a program pointer of the current executing instruction, a flag register 25 to evaluate the operation result, an external bus interface 26 and an external bus buffer 27. The processor 10 executes the packet process by conducting the above components based on the instruction that is externally read.

However, recently, higher speeds and larger amounts of data in data transactions are increasingly required by networks. Also, it is desired to improve the speed of the packet relaying process. Therefore, a special hardware circuit for the packet process has been developed and mounted in the packet relay apparatus because the packet process by software using the processor does not achieve a sufficient performance. However, it is not easy to modify the special hardware circuit in order to carry out a revised protocol or improve a service provided through a network. Disadvantageously, it is needed to newly develop another special hardware circuit each time the protocol is revised or the network service is improved.

On the contrary, the packet process conducted by the processor, which is executed by the instruction (that is, software) in the manner mentioned above, is flexible to be modified in order to carry out the revised protocol and to improve network service after mounting on the packet relay apparatus.

The conventional packet process, which has a high flexibility of modification, is conducted by the processor 10, the memory 11 and circuits being connected to the processor 10 and the memory 11 by the bus 12. The processor 10 transmits the packet data between the processor 10 and memory 11.

However, in the conventional packet process by the processor 10, the packet data temporarily stored in the memory 11 is read out or written on the memory 11. Disadvantageously, it is difficult to carry out a high speed of the packet process.

That is, in the conventional packet process of the processor 10, the packet data are stored in the memory 11. The processor 10 retrieves the packet data when the packet data are needed, and processes the packet data based on contents of the packet data. Then, the processor 10 writes the packet data and the process result in the memory 11. The processor 10 indicates a read-out address to the memory 11 and then reads out data from the memory 11. Similarly, the processor 11 indicates a write address to the memory 11 and then writes data to the memory 11. In this case, compared with a cycle time of the processor 10, it takes much time for the processor 10 to indicate an address to the memory 11 through to complete reading out or writing data from/to the memory 11.

In a sequential execution type of a processor, only a single process can be executed. Thus, a reading operation and a writing operation can not be carried out at the same time. In addition to the above disadvantage, it is difficult to develop a memory circuit that can realize to read out data and simultaneously write data. Generally, it is impossible for the processor to read out data from and write data to the memory at the same time. The above inconvenient operations for the reading process and the writing process to the memory prevent the processor from transmitting data to or from the memory at a high speed.

SUMMARY OF THE INVENTION

It is a general object of the present invention to provide a packet data processing apparatus and a packet relay apparatus using the packet data processing apparatus in which the above-mentioned problems are eliminated.

A more specific object of the present invention is to provide the packet data processing apparatus and the packet relay apparatus using the packet data processing apparatus which can eliminate the disadvantage related to a reading process and a writing process concerning data transmission between the processor and a memory.

The above objects of the present invention are achieved by a packet data processing apparatus for processing a packet received from a network by a processor, including: a packet data access part, which has a plurality of registers arranged in series, shifting the received packet through the plurality of registers toward an outlet in synchronization with a clock, wherein the processor processes the received packet while the received packet is being shifting through the plurality of registers.

According to the present invention, the received packet is shifted sequentially from beginning between the plurality of registers toward the outlet of the packet data processing apparatus by synchronizing with the clock. Therefore, it is possible to shift the packet data toward the outlet, independent of an instruction order. It is possible to execute a packet process by the instruction order that considers clock timings of the packet process. Also, the present invention makes the instruction order possible to be flexibly modified.

The above objects of the present invention are achieved by a packet relay apparatus for forwarding a packet received from a network, including: a plurality of packet data processors being connected in series, each packet data processor including: a packet data access part, which has a plurality of registers arranged in series, shifting the received packet through the plurality of registers toward an outlet in synchronization with a clock, wherein the processor processes the received packet while the received packet is being shifting through the plurality of registers.

According to the present invention, since the plurality of packet data processors are connected in series, it is possible to divide the entire packet process into the plurality of packet data processors and for each packet data processor to independently carry out the divided packet process.

BRIEF DESCRIPTION OF THE DRAWINGS

Other objects, features and advantages of the present invention will become more apparent from the following detailed description when read in conjunction with the accompanying drawings, in which:

FIGS. 4A through 4E are diagrams showing a principle of a data transmission operation of the packet data processor in FIG. 3 according to the first embodiment of the present invention;

FIG. 5 is a diagram showing the packet data processor according to the first embodiment of the present invention;

FIG. 6 is a diagram showing the first embodiment of the packet relay apparatus including the packet data processor according to the present invention;

FIG. 7 is a diagram showing an instruction set provided in the packet data processor according to the first embodiment of the present invention;

FIG. 8 is a diagram showing an instruction order of the data transmission when the packet data processor 30 executes the packet process, according to the first embodiment of the present invention;

FIG. 12 is a diagram showing the instruction orders, which are executed by the packet data processor in the packet data processing apparatus and depicted in a table with a serial number, according to the present invention;

FIG. 13 is a diagram showing a second embodiment of the packet data processing apparatus using the packet data processor according to the present invention;

DESCRIPTION OF THE PREFERRED EMBODIMENTS

In the present invention, a packet access register unit for directly storing packet data is provided in a processor so that a packet data access mechanism is configured to access the packet data at a high speed. Therefore, the present invention can eliminate the disadvantage related to a reading process and a writing process concerning data transmission between the processor and a memory. Consequently, in a packet process using the processor having a high flexibility, the high speed packet process can be realized.

Figure 1:
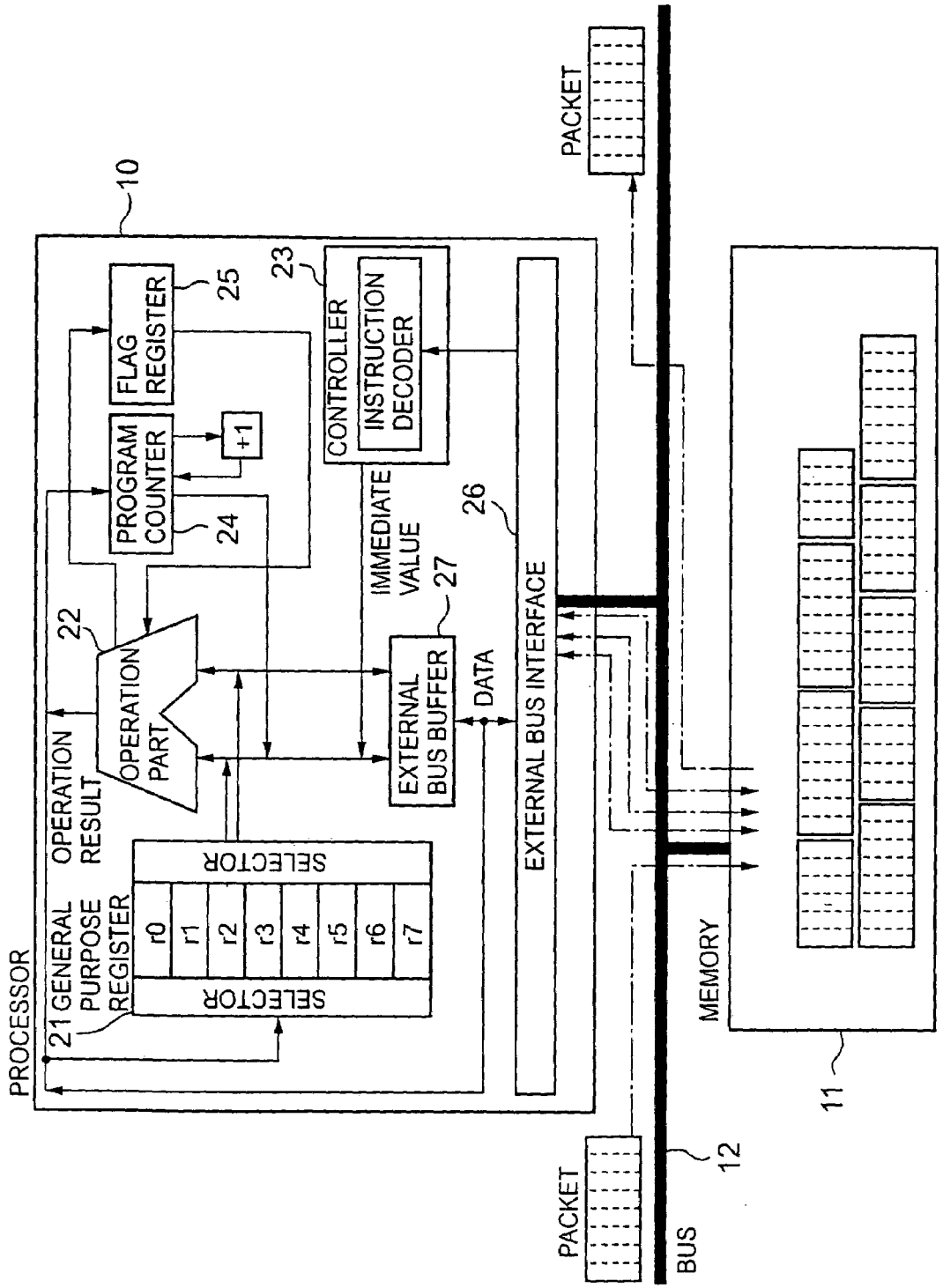
FIG. 1 is a diagram showing a configuration of a conventional packet relay apparatus executing the packet process by a processor.
Figure 2:
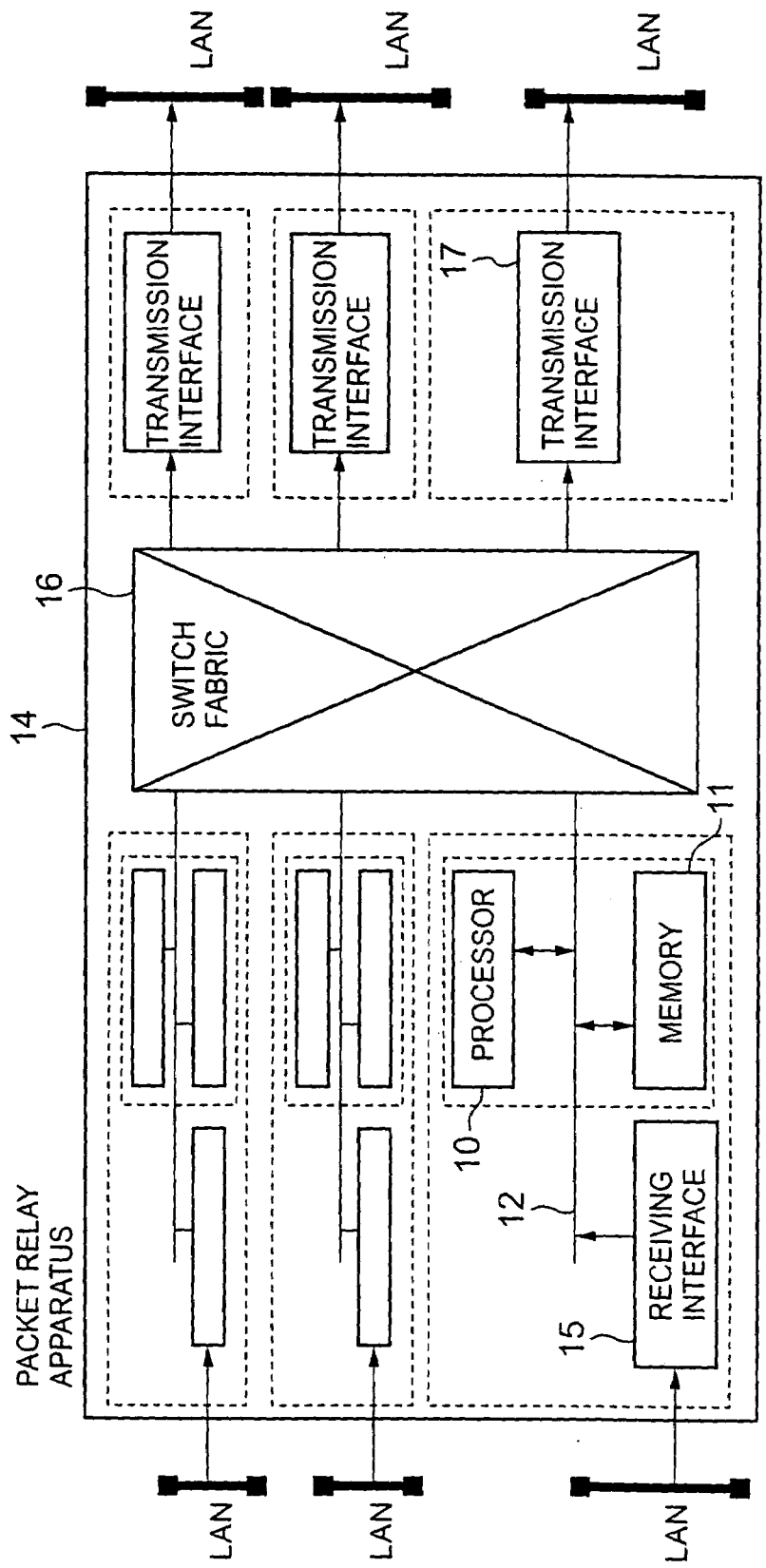
FIG. 2 is a diagram showing a configuration of the conventional packet relay apparatus.
Figure 3:
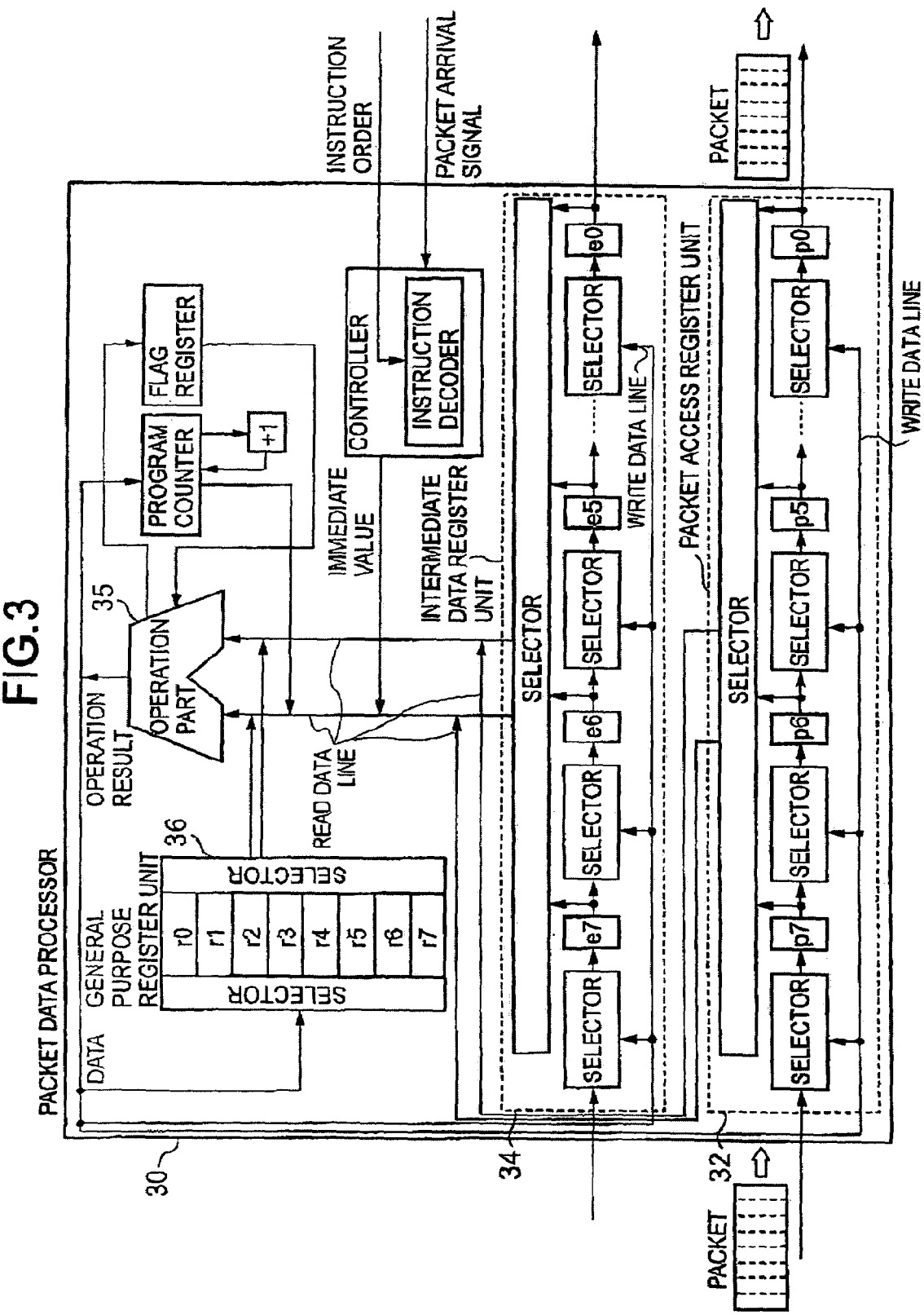
FIG. 3 is a diagram showing a first embodiment of a packet data processor according to the present invention.

FIG. 3 is a diagram showing a first embodiment of a packet data processor according to the present invention. FIGS. 4A through 4E are diagrams showing a principle of a data transmission operation of the packet data processor in FIG. 3 according to the first embodiment of the present invention.

In FIG. 3, in a packet data processor 30, a packet access register unit 32 (for example, a single set of eight registers p0 through p7) is provided as the packet data access mechanism to directly read out the packet data and to access the packet data at the high speed. In addition, a process result of processing the packet data, which is to be attached to the packet data, is transmitted to outside. Since it is required to retrieve the process result at a preceding step before a receiving interface, an intermediate data register unit 34 (for example, a single set of eight registers e0 through e7) is provided to read out the process result to be attached to the packet data, that is, intermediate data from outside, to maintain and transmit the process result to outside as an intermediate maintaining and transmitting mechanism.

The packet data processor 30 receives the packet data via the receiving interface, stores the packet data to the packet access register unit 32 and transmits the packet data from the packet access register unit 32. The packet data processor 30 further stores the process result from the receiving interface to the intermediate data register unit 34. The process result is output from the intermediate data register unit 34. For example, the process result retrieved from the receiving interface may be a receiving interface number that received the packet data to be read out the packet access register unit 32 and the process result to be output by the packet data processor 30 may be a calculation result of a header checksum.

In a data transmission process in which the packet data and the process result are read out from and transmitted to the outside of the packet data processor 30, the packet data processor 30 synchronizes with a clock, sequentially stores packet data sections to the packet access register unit 32 and the process result to the intermediate data register unit 34. The packet data sections and the process result, which are stored, are shifted to the eight registers p0 through p7 in the packet access register unit 32 and to eight registers e0 through e7 in the intermediate data register unit 34 by synchronizing the clock.

In FIGS. 4A through 4E, operations shifting the packet data and the process result in the packet access register 32 and the intermediate data register 34 are described at a clock time unit. In each of FIGS. 4A, 4B, 4C, 4D and 4E, a status of data stored in the packet access register 32 and the intermediate data register 34 by the packet data processor 30 is described at 1, 2, 3, 4 or 17 clock time. That is, FIG. 4B shows the status of the data at one clock time after the status of the data described in FIG. 4A.

In FIG. 4A, the packet data processor 30 does not store sections a0 through a9 of a packet A to the packet access register 32. In FIG. 4B showing the status when one clock has passed, the packet data processor 30 shifts the packet A for one data section and stores the section a0 of the packet A to the register p7. In FIG. 4C, the packet data processor 30 moves the section a0 stored in the register p7 of the packet access register unit 32 and the packet data processor 30 stores next section a1 after the section a0 of the packet A to the register p7 of the packet access register unit 32.

In FIG. 4D, the packet data processor 30 stores the section a2 of the packet A by shifting stored sections in the packet access register unit 32 to next registers. In FIG. 4E showing the status 13 clocks after the status in FIG. 4D, the packet data processor 30 outputs several sections of the packet A after passing register p0 of the packet access register 32 and stores a few sections of a packet B that are next to the packet A. Similarly, the packet data processor 30 shifts data sections stored in the intermediate data register unit 34 by synchronizing the clock. For example, the packet data processor 30 moves data stored in the register e7 of the intermediate data register unit 34 in FIG. 4C, to the register e6 of the intermediate data register unit 34 as shown in FIG. 4D.

In practice, it is difficult to configure the register unit that has a large capacity to store an entire packet from beginning data to ending data in a single processor. However, packet data are partially accessed in the packet process. For example, it may be a lower possibility for the packet data processor 30 to refer to the sections a0 and a9 of the packet A simultaneously. Thus, just the most essential number of registers, for example, eight registers is required for the packet access mechanism and the intermediate data maintaining and transmitting mechanism, and can be configured in the packet data processor 30.

In the intermediate data register unit 34 maintaining and transmitting the process result concerning the packet, data stored in the intermediate data register unit 34 are shifted by synchronizing the packet access register unit 32. For example, as shown in FIG. 4E, a following process to the packet data processor 30 can expect an arrival of an attribute information concerning the packet at one clock after the beginning data of the packet arrives. In the packet relay apparatus, it is not required to configure a special mechanism maintaining storage locations for the packet data and the process result.

A circuit configuration, in which the above packet data processor 30 shifts the data stored in the packet access register unit 32 and the intermediate data register 34 by synchronizing the clock, will now be described. In the packet data processor 30 in FIG. 3, each register of the packet access register 32 is connected to a neighbor register being one in number smaller via a selector. The packet data processor 30 moves the data to the neighbor register being one in number smaller by synchronizing the clock signal of which an external clock signal generator of the packet data processor 30 gives to the packet data processing 30.

Moreover, the packet data processor 30 directly stores the packet data from the outside to the register p7 of the packet access register 32 and directly outputs the packet data from the register p0. In this case, when the beginning of the packet data arrives at the packet data processor 30, the receiving interface of the packet relay apparatus sends a packet arrive signal to the packet data processor 30. In response to the packet arrive signal, the packet data processor 30 conducts the packet process for the arrived packet in accordance with an instruction order that is designed by a apparatus designer and stored in a memory or the like.

Based on the above packet arrive signal, the packet data processor 30 can recognize an irregular timing of the packet arrival and starts to execute the packet process from the beginning of the instruction order when the packet arrives. In a case in which an operation part 35 executes a writing operation for updating a packet header with the process result, each selector provided between registers of the packet access register unit 32 selects write data from the operation part 35 for a destination register. In an other case, each selector selects data stored in the neighbor register being bigger in number so that the packet access register unit 32 operates as the shift register.

The intermediate data register unit 34 operates similarly to the packet access register unit 32. The packet data processor 30 directly sends the process result attached to the packet data from a preceding step of the receiving interface to the register e7 of the intermediate data register unit 34 and outputs the process result from the register e0 of the intermediate data register unit 34 to a following step of a switch fabric.

In the packet data processor 30, the operation part 35 and the packet access register unit 32 or the intermediate data register unit 34 are not connected via a bus but directly connected as shown in FIG. 3. It is possible to read out or write data from or to the packet access register unit 32 or the intermediate data register 34 by synchronizing the cycle time of the packet data processor 30. As a result, the packet data processor 30 can eliminate the disadvantage related to the reading or writing operation for the packet data and can execute the reading or writing operation at high speed.

Furthermore, instead of shifting data between registers in the packet access register unit 32 or the intermediate data register unit 34 by the instruction order provided in the packet data processor 30, for example, a data transmission instruction order, the packet data processor 30 shifts the data to the neighbor register independent of the instruction order. Thus, the packet data processor 30 can execute an arithmetic operation or other operation simultaneously when the packet data processor 30 shifts the data. In this case, regardless of the instruction order, the packet data processor 30 can replace data in each register of the packet access register unit 32 and the intermediate data register unit 34. That is, the packet data processor 30 is configured so that the receiving interface sends the packet arrival signal to the packet data processor 30 when the receiving interface receives the packet and the entire data stored in the packet access register 32 and the intermediate data register 34 is shifted by synchronizing the clock signal. Also, each instruction indicated by the instruction order is completed within the same number of clock pulses. A device designer, such as a programmer, of the instruction order can recognize which sections of the packet data or the process result in the packet access register unit 32 and the intermediate data register unit 34 are stored.

Thus, when the data, which are the packet data or the process result of the packet data, stored in each register, are changed, the device designer of the instruction order checks the data stored in each register in every step and modifies the instruction order so that the packet process for the packet data and the process result can carry out based on the modified instruction order.

As mentioned above, the mechanism for directly reading out and writing the packet data and the process result is provided. Also, in the mechanism, the data transmission is conducted independently of the instruction order. Therefore, the disadvantage related to the conventional reading process and writing process for the packet data is eliminated. It is possible to provide the high speed packet process having high flexibility based on the instruction order.

FIG. 5 is a diagram showing the first embodiment of the packet data processor according to the present invention. In FIG. 5, the packet access register unit 32 and the intermediate data register unit 34 in FIG. 3 are simply described. FIG. 6 is a diagram showing the first embodiment of the packet relay apparatus including the packet data processor according to the present invention. Also, FIG. 7 is a diagram showing an instruction set provided in the packet data processor 30 according to the first embodiment of the present invention and FIG. 8 is a diagram showing an instruction order of the data transmission when the packet data processor 30 executes the packet process, according to the first embodiment of the present invention.

In the first embodiment of the packet data processor, the packet data processor 30 includes the packet access register unit 32 for storing 16 words per 32 bits of the packet data and the intermediate data register unit 34 for maintaining and transmitting the process result of the packet data. A header checksum calculation process, which is one of applications the packet data processor 30 executes, will now be described.

In FIG. 5, the packet data processor 30 includes the packet access register unit 32 for storing 16 words per 32 bits of the packet data and the intermediate data register unit 34 for maintaining and transmitting the process result of the packet data and executes the packet process. The packet processor 30 includes an architecture in which one basic word has 32 bits to internally process data. And, the registers r0 through r7 of the general purpose register unit 36, the registers e0 through e7 of the intermediate data register unit 34 and the register p0 through p7 of the packet access register unit 32 have 32-bit length, respectively.

The packet data processor 30 includes the instruction set of instruction types shown in FIG. 7 and executes each instruction in accordance with the instruction order shown in FIG. 8. In FIG. 8, in an instruction description format that is a rule to describe an instruction, a condition code such a character "A", "≠" or the like is always additionally provided at a position preceding a mnemonic instruction depicted by such as "MOVE" or the like. When an operation result of a previous instruction corresponds to an indication of the condition code, the packet data processor 30 executes a current instruction indicated by the condition code.

For example, when the operation result of the previous instruction which the packet data processor 30 executed is zero and the condition code which the packet data processor 30 currently executes shows "=" (=0), the instruction indicated by the condition code "=" is executed. When the operation result of the previous instruction is a value other than "0", the instruction indicated by the condition code "=" is not executed. As the condition code, for example, "=" (equal to zero), "≠" (not equal to zero), "<" (less than zero), ">" (greater than zero) and "A" (Always execute) are provided. A flag register 37 provides a number of flags for condition codes for the previous operation results.

Also, a carry flag is provided in the flag register 37 to maintain a carry bit of an operation result. In the operation instruction format, when three operands are needed, a description of 'condition code, mnemonic instruction, destination operand, source operand 1, source operand 2' is required. When two operands are needed, another description of 'condition code, mnemonic instruction, destination operand, source operand 1' is required.

The instruction order for reading out data from the memory by the packet data processor 30, for example, is described by a designer of the packet relay apparatus and is stored in the memory of the packet relay apparatus. Moreover, for example, when the packet relay apparatus is turned on, the memory sends each instruction based on the instruction order to the packet data processor 30. The packet data processor 30 decodes each instruction by an instruction decoder 39 provided in a controller 38 and maintains a result of decoding the instruction in the controller 38 in the packet data processor 30. Therefore, it is not required for the packet processor 30 to use the clock in order to read out instructions during the packet process. The packet data processor 30 executes each instruction shown in FIG. 7 at a constant number of clock pulses, that is, a constant clock frequency.

In FIG. 5, the packet data processor 30 executes, for example, an IP header checksum calculation for a packet C when the packet data processor 30 communicates via the packet C in FIG. 5 on the Ethernet, which is one of data transmission standards of LAN. The IP header checksum calculation is executed to check whether or not an IP header is transmitted without any errors. When the packet C arrives at the packet data processor 30, a bit alignment output part 40, which is provided at a step preceding the packet data processor 30 shown in FIG. 6, aligns the IP header of the packet C based on a 32-bit alignment and outputs the packet C to the packet data processor 30. Then, the packet data processor 30 receives the packet C.

In FIG. 6, the bit alignment output 40 aligns 16-bit input data from the receiving interface to be 32-bit data so that the IP header of the packet C is aligned. Then, the packet C including aligned IP header is output to the packet data processor 30. Hereinafter, sections of the packet C in FIG. 5 are described by sections c0 through c16, respectively from the beginning of the packet C. In a right most column for "SECTION WHICH OF PACKET C IS STORED IN PACKET ACCESS REGISTER UNIT" in FIG. 8, the sections of the packet C are described by sections c0 through c16. In the IP header checksum calculation, the IP header is recognized as one word per 32 bits and each summation is calculated by ones complement. As a result, an upper 16 bits and lower 16 bits are calculated by adding each other as a 16-bit word. When ones complement of a result of the addition shows zero, the IP header does not have any error.

When the bit alignment output part 40 outputs the beginning of the packet C to the packet data processor 30, the bit alignment output part 40 sends the packet arrival signal to the packet data processor 30. The packet data processor 30 executes instruction from an order number 1 of the instruction order in FIG. 8. The packet data processor 30 executes all instructions at a constant clock pulse number. When the packet C arrives, the packet data processor 30 sequentially stores an Ethernet header in the register p7 of the packet access register unit 32 and stores the beginning section c4 of the IP header in the register p7 at a fifth clock. In this case, the packet data processor 30 executes by synchronizing the clock of the packet data processor 30 and independent of the instruction order.

During the order number 1 through 4 of the instruction order in which the packet data processor 30 stores the beginning section c4 of the IP header to the register p7, the packet data processor 30 transmits the section c4 stored in the register p7 of the packet access register unit 32 to the register r0 of the general purpose register unit 36 at the fifth clock. At the next clock, the packet data processor 30 adds data of the register p7 and data of the register r0 and then stores an addition result to the register r0. During the addition operation, the packet data processor 30 shifts the section c4 of the IP header stored in the register p7 at the previous clock to the register p6 and stores the next section c5 of the packet C to the register p7. That is, the instruction indicated by the order number 5 of the instruction order adds the section c4 of the IP header and the following section c5 and stores addition result in the register r0.

In a next order number 7 of the instruction order, the packet data processor 30 adds the section c6 stored in register p7 and a value of register r0 and stores a new value resulting from adding a carry bit of the above addition indicated by the order number 6 to the register r0 in order to calculate the above addition by an ones complement. Similarly, in an instruction orders 8 and 9, the packet data processor 30 further adds the sections c7 and c8 of the IP header to the register r0. In an order number 10 of the instruction order, the packet data processor 30 further adds an immediate instruction '0' (denoted by '$0' in FIG. 8, that is, a value itself is indicated, instead of an register name), the register r0 and a carrying value resulting from adding based on an instruction indicated by an order number 9, and then stores a result of the above addition to the register r0. From the above calculations, the result of each summation calculated by the ones complement is stored in the register r0 of the general purpose register unit 36 where the IP header is aligned as a single 32-bit word.

Furthermore, in an order number 11 of the instruction order, the packet data processor 30 sends data of the register r0 to the register r1. In an order number 12 of the instruction order, the packet data processor 30 shifts data of the register r0 lower by 16 bits and then stores an upper 16 bits and the lower 16 bits of the above summation result to the register r0 and the register r1, respectively. In an order number 13 of the instruction order, the packet data processor 30 adds data of the register r0 and data of the register r1 by a 16-bit word unit and then stores the addition result to the register r0. Also, in an order number 14 of the instruction order, the packet data processor 30 calculates the data of the register r0 by the ones complement by a 16-bit word unit. In an order number 15 of the instruction order, since a prefixal instruction code of the mnemonic instruction 'MOVE' is '≠', the packet data processor 30 stores an immediate value 1 to the register e0 of the intermediate data register unit 32 when the result of the previous order number 10 is not '0'.

In a next clock, the packet data processor 30 outputs data of the register e0. Thus, it is possible to output the result of the IP header checksum outside of the packet data processor 30. Also, the packet data processor 30 can realize an error of the IP header when the intermediate data register unit 34 shows '1' at a ninth clock from the arrival of the header of the packet C.

In the packet relay apparatus 41 shown in FIG. 6, when the packet C is received at the receiving interface 42, the received packet C is aligned and provided to the packet data processor 30 by the bit alignment output part 40. When the packet data processor 30 completes the packet process including the checksum, the destination table search, the packet header replacement or the like for the received packet C, the packet data processor 30 sends the packet C with determined destination information, which is to be attached to the packet C, to the switch fabric 44. And, the packet relay apparatus 41 transmits the packet C from the switch fabric 44 via an appropriately selected transmission interface 45 based on the determined destination. The packet C is transmitted from the transmission interface 45 to the LAN and is relayed toward an ultimate destination.

As mentioned above, the packet data processor 30 executes the instruction order for shifting data between registers by synchronizing the clock. Thus, it is possible for the packet data processor 30 to execute the IP header checksum, which is one of applications of the packet process, and outputs the result of the IP header checksum to the outside of the packet data processor 30 while the packet C is being shifted.

Moreover, the packet data processor 30 directly reads out the packet data and the process result, stores to the registers and outputs the packet data and the process result by shifting data to neighbor registers, respectively, independent of the above mentioned process in accordance with the instruction order. In the present invention, the instruction order in which the data shifting is considered is executed. A modification of the instruction order is flexible to carry out several kinds of processes. Therefore, a high flexibility of modification and a high-speed packet process can be realized from the instruction order.

In the first embodiment of the packet data processor, the IP header checksum as one of applications of the packet process is described. But, even when the instruction order is modified, it is possible for the packet data processor 30 to execute processes concerning the packet data and the process result for the packet C, similarly to the above the IP header checksum and also execute the packet process for other packets.

In the first embodiment of the packet data processor, the bit alignment output part 40 is provided before the packet data processor 30 in FIG. 6. But, the packet data processor 30 may execute a process for the bit alignment by the instruction order where the packet process is indicated. Thus, it is possible to execute the packet process including the bit alignment similarly to the above mentioned packet process. When the instruction order is given to the packet data processor 30, as a maintaining manner, a result from decoding the instruction may be given from outside to the packet data processor 30 or may be maintained in a special memory provided outside of the packet data processor 30. In any one of the maintaining manners, in a condition where each instruction is completed for one clock time or a constant number of clock pulses, the data shifting mechanism for the packet data is synchronized with the instruction order. Therefore, the packet processor 30 can execute the packet process at the high speed, similarly to the described manner in the first embodiment.

Moreover, in the first embodiment of the packet data processor, the clock speed for the packet data processor 30 is the same speed as the clock speed for shifting data stored in the packet access register unit 32 and the intermediate data register unit 34. But, the clock speed for the packet data processor 30 may be two times faster than the clock for external circuits. The instruction order may be modified so that the processes for taking data in, shifting data or sending data out can be executed at every two clocks of the packet data processor 30. Thus, the packet process can also be carried out at the high speed in the same manner mentioned above. Alternatively, the clock may be used to synchronize the packet data processor 30 with the data shifting mechanism. Thus, the packet data processor 30 can carry out the packet process at the high speed in the same manner as the first embodiment.

In the first embodiment of the packet data processor, the packet data processor 30 stores the packet data itself in the packet access register unit 32 and the stored packet data is shifted in the packet access register unit 32. It should be noted that the present invention is not limited to store the packet data in the packet access register unit 32, but indicators concerning the packet data can be stored.

Furthermore, in the first embodiment of the packet data processor, the data stored in the packet access register unit 32 is moved to the next register by synchronizing the clock. But, instead of moving the data to the next register, the selector may sequentially select the register based on the clock cycle used to execute the instruction. Even if the same register, for example, the register p0, is always indicated, the packet data stored in the packet access register unit 32 can be shifted.

Figure 9:
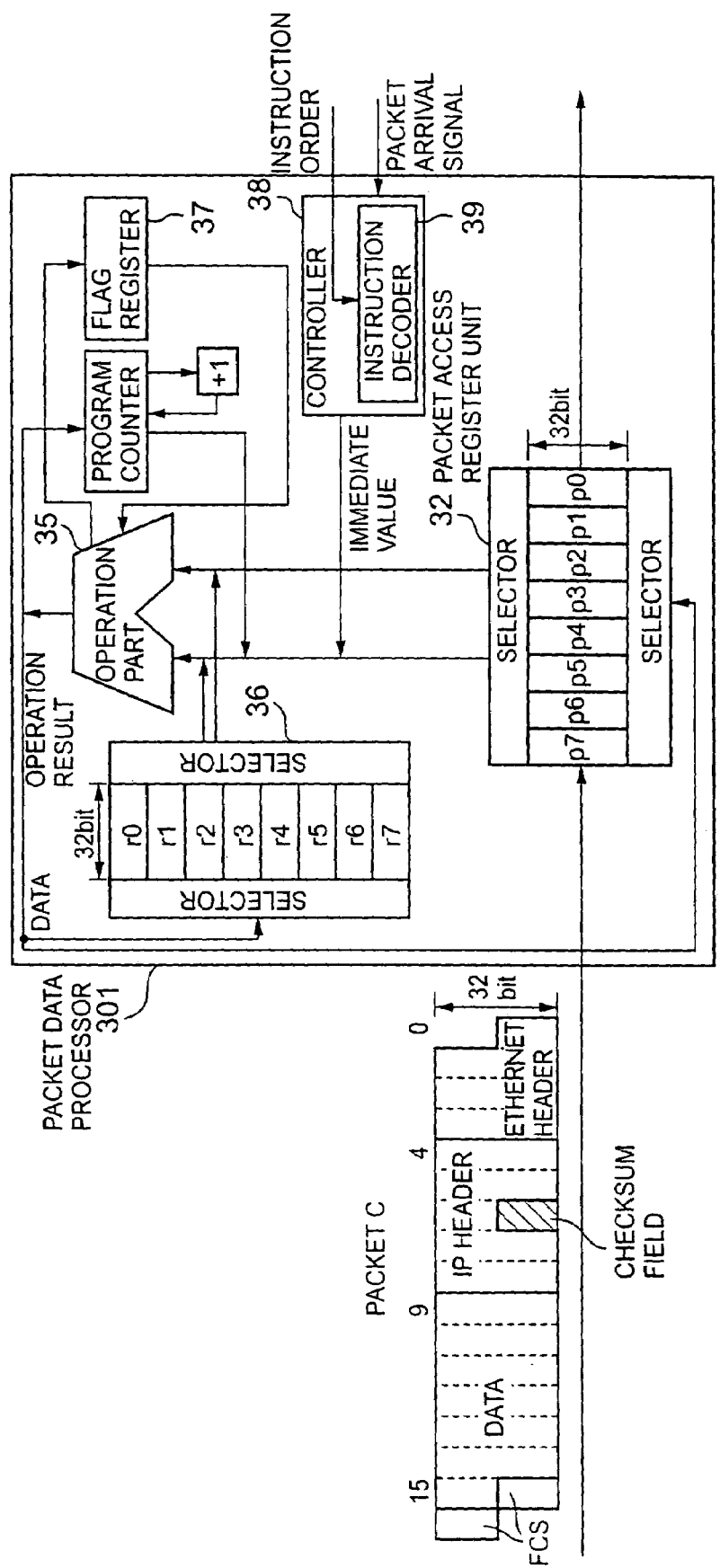
FIG. 9 is a diagram showing a second embodiment of a packet data processor according to the present invention.

FIG. 9 is a diagram showing a second embodiment of the packet data processor according to the present invention. A packet data processor 301 in FIG. 9 includes the packet access register unit 32 but not the intermediate data register unit 34 and carries out the packet process. The intermediate data register unit 34 is configured to sends the process result of packet data, which is to be attached, and the attribute information concerning the packet data out of the packet data processor 301. And also, the intermediate data register unit 34 is capable of receiving data from outside of the packet data processor 301. In a case in which data concerning packet process executed by the packet data processor 301 requires a mechanism similar to the intermediate data register unit 34, the packet access register unit 32 instead of the intermediate data register unit 34 makes it possible for the packet data processor 301 to carry out the packet process.

Based on data concerning the packet process, necessary sections of the packet data are read out and the read necessary sections are processed. Just the packet access register unit 32 is necessary to process a result of processing the sections into the packet data. For example, in a case of an IP header checksum re-calculation which is one of applications for the packet process and different from the IP header checksum calculation, the IP header is read out and then a calculated checksum value is written in a checksum field of the packet data. Consequently, in the IP header checksum re-calculation, it is not required to send the process result of the packet data, which is attached to the packet data, and the attribute information concerning the packet data out of the packet data processor 301 or to receive data from the outside of the packet data processor 301. Therefore, only the packet access register unit 32 is required for the packet data processor 301 to carry out the IP header checksum re-calculation.

Figure 10:
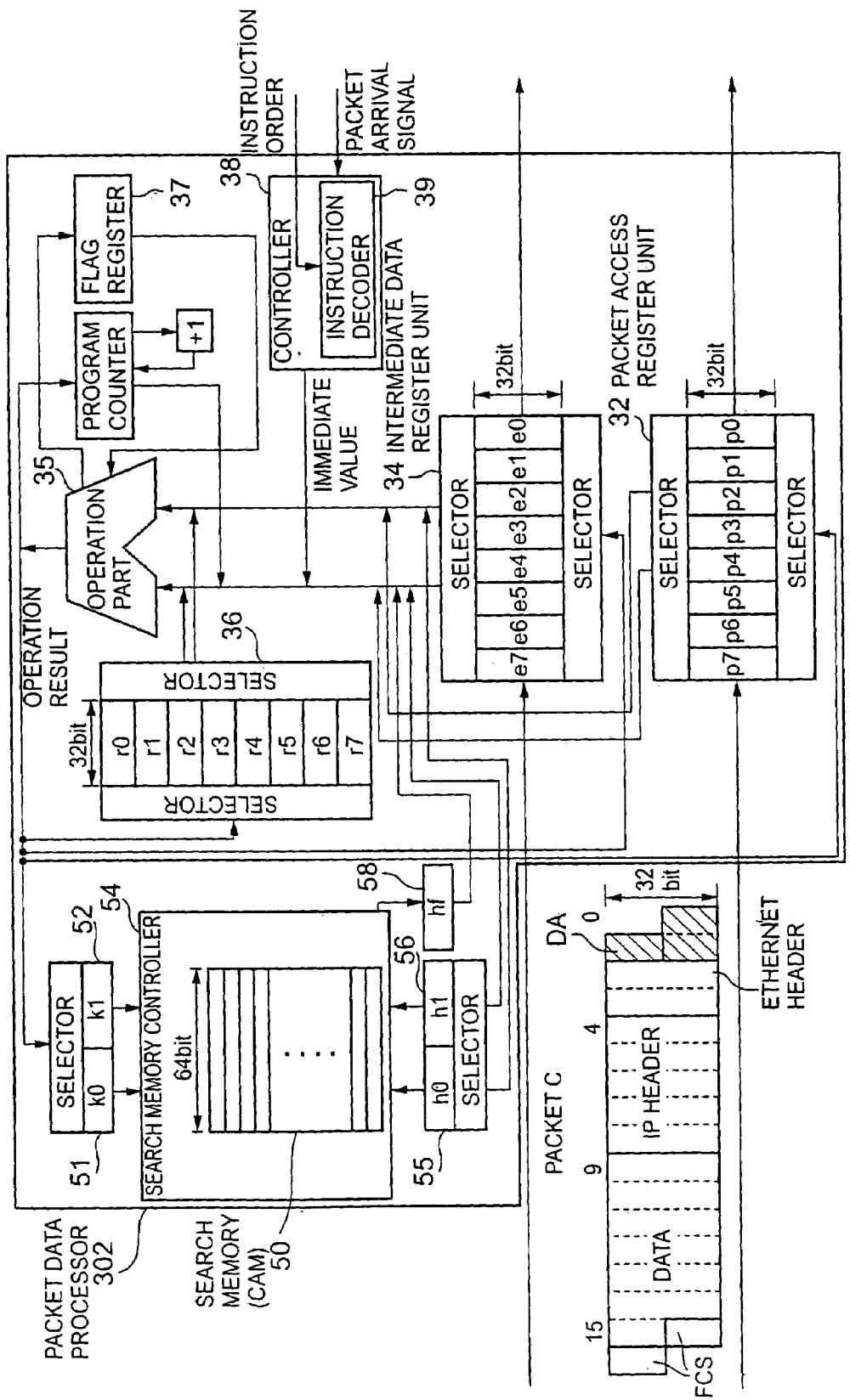
FIG. 10 is a diagram showing a third embodiment of a packet data processor according to the present invention.

FIG. 10 is a diagram showing a third embodiment of the packet data processor according to the present invention. As shown in FIG. 10, a packet processor 302 includes a search memory 50 for storing a destination table or the like in the packet data processor 302. The packet data processor 302 determines one of transmission interfaces based on the destination address indicated in the packet header, that is, one of LANs which is an approximate communication path toward the destination address, by searching the search memory 50 provided in the packet data processor 302.

The packet data processor 30 stores a table showing a correspondence between the destination address indicated in each packet header and an output in the search memory 50. In the packet process, the packet data processor 302 can obtain information including the transmission interface necessary to send the packet out by searching the destination table. For example, a forwarding table, which shows the transmission interface number corresponding to the destination address provided in an Ethernet header, that is, a DA (Destination Address) in the packet C in FIG. 10, is stored in the search memory 50. The approximate transmission interface number to forward the packet is obtained by searching the search memory 50 from the destination address maintained in the packet as a search key.

In the search memory 50 in FIG. 10, one entry includes 64 bits. In a searching operation, when the packet data processor 30 sets search key information to search key registers 51 and 52 (k0, k1) based on the instruction, a search memory controller 54, independent of the instruction order, compares every entry in the search memory 50 with data of the search key registers 51 and 52. Then, the search memory controller 54 outputs entry data corresponding to the data of the search key registers 51 and 52 to hit content registers 55 and 56 (h0, h1). Also, the search memory controller 54 outputs information showing whether or not the entry corresponding to the data of the search key registers 51 and 52 exists, to a search flag register 58 (hf).

In this case, in order to carry out the packet process based on the instruction order by the packet data processor 302, it is required for the packet data processor 302 to always obtain the search result at the constant number of clock pulses, independently of the number of entries stored in the search memory 50 even if the number of entries are increased. If the above searching process is not completed at the constant clock pulse number and the packet data processor 30 fails to obtain the search result at the constant clock pulse number, the data shifting process fails to synchronize with the instruction order. As a result, at a certain time, the describer of the instruction order can not recognize which data the packet data processor 302 stored in each register. Consequently, the search memory controller 54 compares all entries with data of the search key registers 51 and 52 in parallel, instead of comparing with each entry one by one in sequence. To realize the above comparing process, for example, a CAM (Content Addressable Memory) may be used as a memory device.

As mentioned above, the packet data processor 302 accesses the search memory 50 using, for example, CAM by using the search key registers 51 and 52 so that the packet data processor 302 can obtain the search result by synchronizing with the above data shifting process in the packet access registers unit 32 and the intermediate data register unit 34. Thus, the packet data processor 302 can modify the packet access register unit 32 and the intermediate data register unit 34 based on the search result by the instruction. Therefore, the packet data processor 302 including the search memory 50 shown in FIG. 10 can execute the packet process for searching the table.

In the third embodiment of the packet data processor, the packet data processor 302 includes the search memory 50, one entry of which has 64 bits, the search key registers 51 and 52 being two sets of 32 bit length register, the registers 55 and 56 for obtaining the search result, which are two sets of 32 bit length, and the single register 58 for checking the search result. It should be noted that the packet data processor 302 does not depend on the length of the entry or a number of registers and can obtain the search result at the constant number of clock pulses. In a case in which the search memory 50 has a mechanism for synchronizing with the data shifting in the packet access register unit 32 and the intermediate data register unit 34, the packet data processor 302 can carry out the packet process in the same manner as mentioned above.

Figure 11:
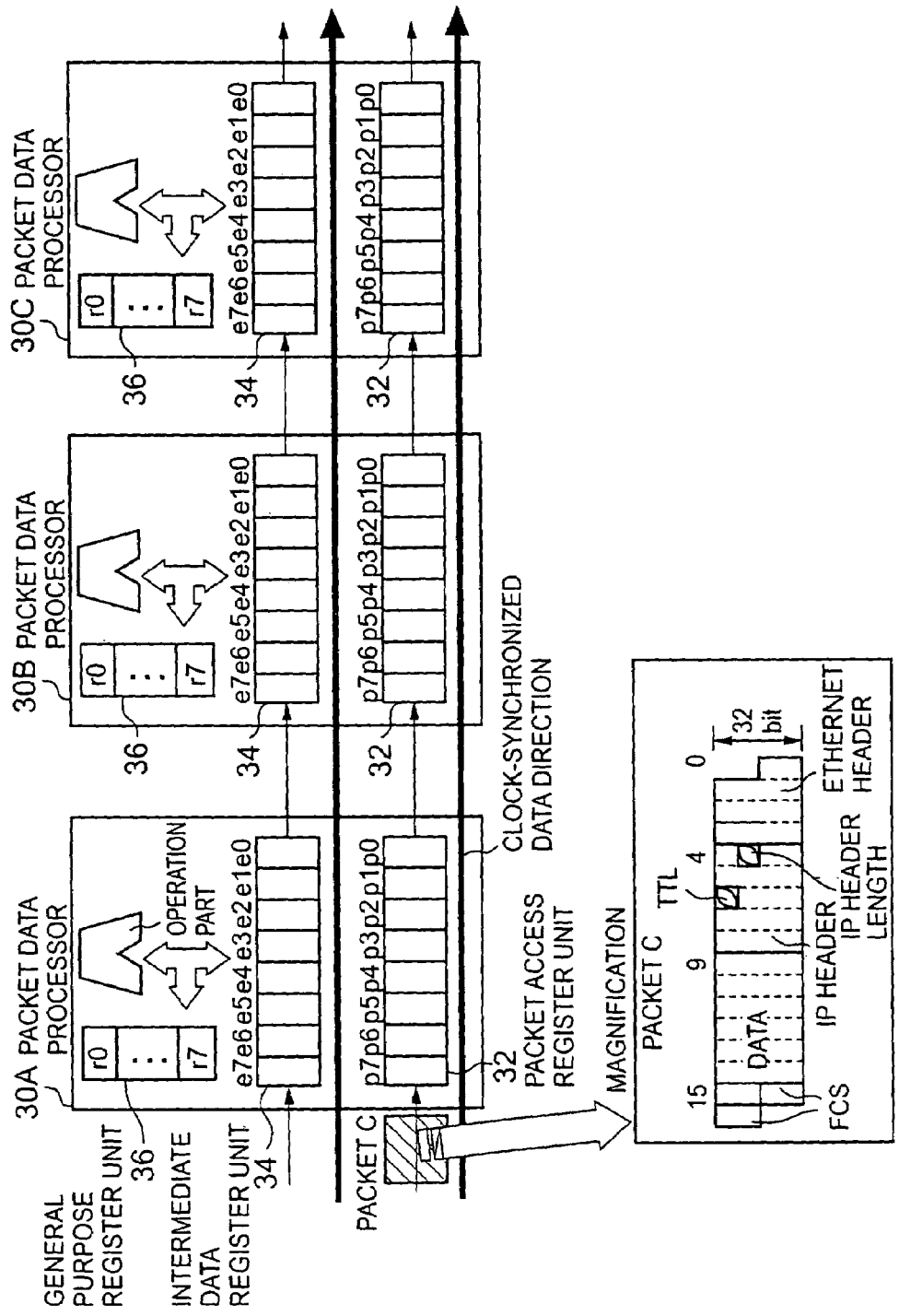
FIG. 11 is a diagram showing a first embodiment of a packet data processor using the packet data processor according to the present invention.

FIG. 11 is a diagram showing a first embodiment of a packet data processor using the packet data processor 30 according to the present invention.

In FIG. 11, three packet data processors 30A, 30B and 30C are connected in series. In the packet process, data output from the intermediate data register unit 34 or the packet access register unit 32 of each of the packet data processor 30A and 30B are input to each of the next packet data processor 30B and 30C, respectively. These three packet data processor 30A, 30B and 30C are directly connected in series in a single integrated circuit chip by wiring. A previous packet data processor sends data to a next packet data processor.

FIG. 12 is a diagram showing the instruction orders, which are executed by the packet data processor 30A, 30B and 30C in the packet data processing apparatus and depicted in a table with a serial number, according to the present invention. In the packet process, for example, the packet data processor 30A executes an IP header length check, the packet data processor 30B executes the IP header checksum calculation and the packet data processor 30C executes a TTL (Time to Live) decrease operation.

In the IP header length check, it is checked whether or not a value stored in an IP header field of the IP header (shown in magnified diagram of the packet C in FIG. 11) is less than '5' which is an invalid value. In the IP header checksum calculation, the same process as mentioned before is executed. In the TTL decrease operation, a value stored in a TTL field of the IP header is decreased. The value in the TTL field is decreased each time a packet passes through a packet relay apparatus. When a result from decreasing the TTL is '0', the packet is discarded. Thus, the TTL decrease operation suppresses the packet to be continuously relayed by an error caused by a network operation.

The packet data processor 30A reads out the beginning data of the packet C in FIG. 11 and then the IP header length check, which is one of applications for the packet process, is executed from an order number 1 in accordance with the instruction order for the packet data processor 30A in FIG. 12. Thus, the packet C is output to the packet data processor 30B. Next, the packet data processor 30B reads out from the beginning data of the packet C and then the IP header checksum calculation, which is one of applications for the packet process, is executed from an order number 1 in accordance with the instruction order for the packet data processor 30B in FIG. 12. Thus, the packet C is output to the packet data processor 30C. Next, the packet data processor 30C reads out from the beginning data of the packet C and then the TTL decrease operation, which is one of applications for the packet process, is executed from an order number 1 in accordance with the instruction order for the packet data processor 30C in FIG. 12.

Referring to FIG. 12, in the serial numbers 17 through 23, the instruction order for the packet data processor 30B and the instruction order for the packet data processor 30C are executed in parallel. That is, both of the packet data processors 30B and 30C process the packet C simultaneously. In the instruction order for the packet data processor 30A in FIG. 12 to execute the IP header length check, before the IP header length field of the IP header of the packet C reaches the packet data processor 30A, the packet data processor 30A creates a bit pattern for retrieving the IP header length field to the register r1 of the general purpose register unit 36 by the order numbers 2 through 4 of the instruction order, stores the value in IP header length field to the register r0 by the order numbers 5 and 6 of the instruction order, decreases an immediate value 5 for minimum header length by the order number 7, checks whether or not the decreased result is negative, and writes a checked result in the intermediate data register unit 34 by the order number 8. Consequently, the packet data processor 30A sends the checked result out of the packet data processor 30A.

The instruction order for the packet data processor 30B to execute the IP header checksum calculation is the same instruction order shown in FIG. 8. The packet data processor 30B executes the same packet process as the packet data processor 30 in FIG. 5.

In the instruction order for the packet data processor 30C in FIG. 12 to execute the TTL decrease operation, before the TTL field of the IP header of the Packet C reaches the packet data processor 30C, the packet data processor 30C creates a bit pattern for retrieving fields other than the TTL field to the register r3 of the general purpose register unit 36 by the order numbers 4 through 6 of the instruction order, stores the value in the TTL field to the register r1 by the order numbers 7 and 8 of the instruction order, decreases an immediate value 5 by the order number 9, checks whether or not the decreased result is '0', and writes a checked result in the intermediate data register unit 34 by the order number 10.

In addition, the packet data processor 30C stores the TTL field and other fields in the packet access register unit 32 by the order number 11 through 13 and carries out updates concerning the TTL field of the packet header. The packet data processor 30C writes values corresponding to the updates to the intermediate data register unit 34. For example, it can be realized that the next switch fabric 44 receives the written values but does not forward the packet.

The above instruction orders describe the instructions for the packet C only. In practice, packets arrive intermittently but continuously at the packet data processing apparatus. For example, a pipeline process by multiple processors may be applied so that a next packet D can be processed by the packet data processor 30A from the serial number 20. In the serial number 17 through 23, the packet data processor 30B and the packet data processor 30C simultaneously execute processes for the same packet C. It is also one of pipeline processes for the single packet C.

As mentioned above, a plurality of the packet data processors 30A, 30B and 30C are connected as shown in FIG. 11 and each of packet data processors 30A, 30B and 30C independently executes the packet process by the instruction orders shown in FIG. 12. The packet process can be carried out as the pipeline process. Also, the packet process having a large amount of process data can be carried out at high speed. In the first embodiment of the packet data processing apparatus, a logical single operation set, which is a part of the packet process such as the IP header length check, the IP header checksum calculation or the TTL decrease operation executed by each packet data processor 30A, 30B or 30C, is conducted. But alternatively, within a total clock pulse number in which a single packet data processor execute a process, for example, the packet data processor 30A may execute the IP header length check and continue to execute until a middle of the IP header checksum calculation. Regardless of the logical single operation set, it is possible to execute the packet process.

FIG. 13 is a diagram showing a second embodiment of the packet data processing apparatus using the packet data processor 30 according to the present invention. In FIG. 13, three packet data processor 30A, 30B and 30C are connected in series. In the packet process, data output from the intermediate data register unit 34 or the packet access register unit 32 of each of the packet data processor 30A and 30B are input to each of the next packet data processor 30B and 30C, respectively. In addition, a global (shared) register unit 60 is provided as an area where the three packet data processor 30A, 30B and 30C share data.

The global register unit 60, for example, includes eight 32-bit length registers g0 through g7 and is additionally and directly connected to each packet data processor 30A, 30B or 30C in the single integrated circuit chip by wiring. Therefore, each packet data processor 30A, 30B or 30C can directly access the global register unit 60 using the same instructions as the registers provided in each packet data processor 30A, 30B or 30C.

The global register unit 60 as the same as the general purpose register unit 36 is adjacent to selectors 61 and 62 for selectively specifying one registers g0 through g7 and each packet data processor 30A, 30B or 30C independent sends a selecting signal to the selectors 61 and 62. The selector 61 receives the selecting signal for selectively specifying one of registers g0 through g7 which is used to read out data from the packet access register unit 32 of each packet data processor 30A, 30B or 30C and selects one of register g0 through g7 based on the received selecting signal. Then, the packet data processor 30A, 30B and 30C simultaneously read out data from the specified registers, respectively.

On the other hand, since the global register unit 60 is the shared area of the plurality of the packet data processors 30A, 30B and 30C, the packet data processors 30A, 30B and 30C may write data in the global register unit 60 simultaneously. However, advantageously, the packet process of each packet data processor 30A, 30B or 30C synchronizes with the packet C in FIG. 13. Thus, it is possible to recognize which packet data processor executes what instruction at a point. In this case, the device designer can make the instruction order beforehand in order to prevent access conflicts of the global register unit 60. It is not required to control the access conflicts of the global register unit 60.

Consequently, for example, when the selector 62 receives a selecting signal for selecting one of the registers g0 through g7 to write data from each packet data processor 30A, 30B and 30C, the selector 62 selects the selecting signal simply in accordance with priority of an order of the packet data processors 30A, 30B and 30C and then selects one of registers g0 through g7. By providing the global register unit 60, between the packet data processor 30A, 30B and 30C, for example, it is possible to realize another data transmission such that a processor reads out data immediately after another processor writes the data, instead of one way data transmission from the packet data processor 30A to the packet data processor 30B and to the packet data processor 30C.

That is, the packet process, which is generally executed by using the general purpose register unit 36 provided in the single packet data processor 30, is simultaneously executed in parallel by using two packet data processors 30 and the global register unit 60. Therefore, the packet process can be carried out at higher speed.

For example, the above packet process can be described by the instruction order in FIG. 12. In the instruction order for the packet data processor 30C, waiting time until a necessary field of a packet arrives is utilized to create the bit pattern which is used later (the order numbers 4 through 6). However, when the waiting time does not exist, the bit pattern is created after a last order number 15 of the instruction order for the packet data processor 30B, data are written in the global register unit 60. Then, the packet data processor 30C utilizes the global register unit 60. In this case, in the packet data processor 30C, it is possible to effectively create the bit pattern by executing the instructions within a less number of clock pulses than the packet data processor 30C itself creates the bit pattern. As mentioned above, by providing the global register unit 60, it is possible to optimize the instruction order between the packet data processors 30A, 30B and 30C.

Also, in a case in which entire packet data can not be stored in the packet access register unit 32, portions of the packet data, which can not be stored in the packet access register unit 32, are stored in the global register unit 60. Consequently, it is possible for the next packet data processor 30B or 30C to refer to the portions of the packet data.

In addition, the global register unit 60, instead of being a data transmission means, can be utilized as the general purpose register unit 36 for each packet data processor 30A, 30B or 30C. Therefore, instead of increasing a number of registers in the general purpose register unit 36 of each packet data processor 30A, 30B or 30C, the global register unit 60 can be multi-used by the packet data processor 30A, 30B and 30C. It is substantially possible to increase the number of registers for the general purpose register unit 36.

Figure 14:
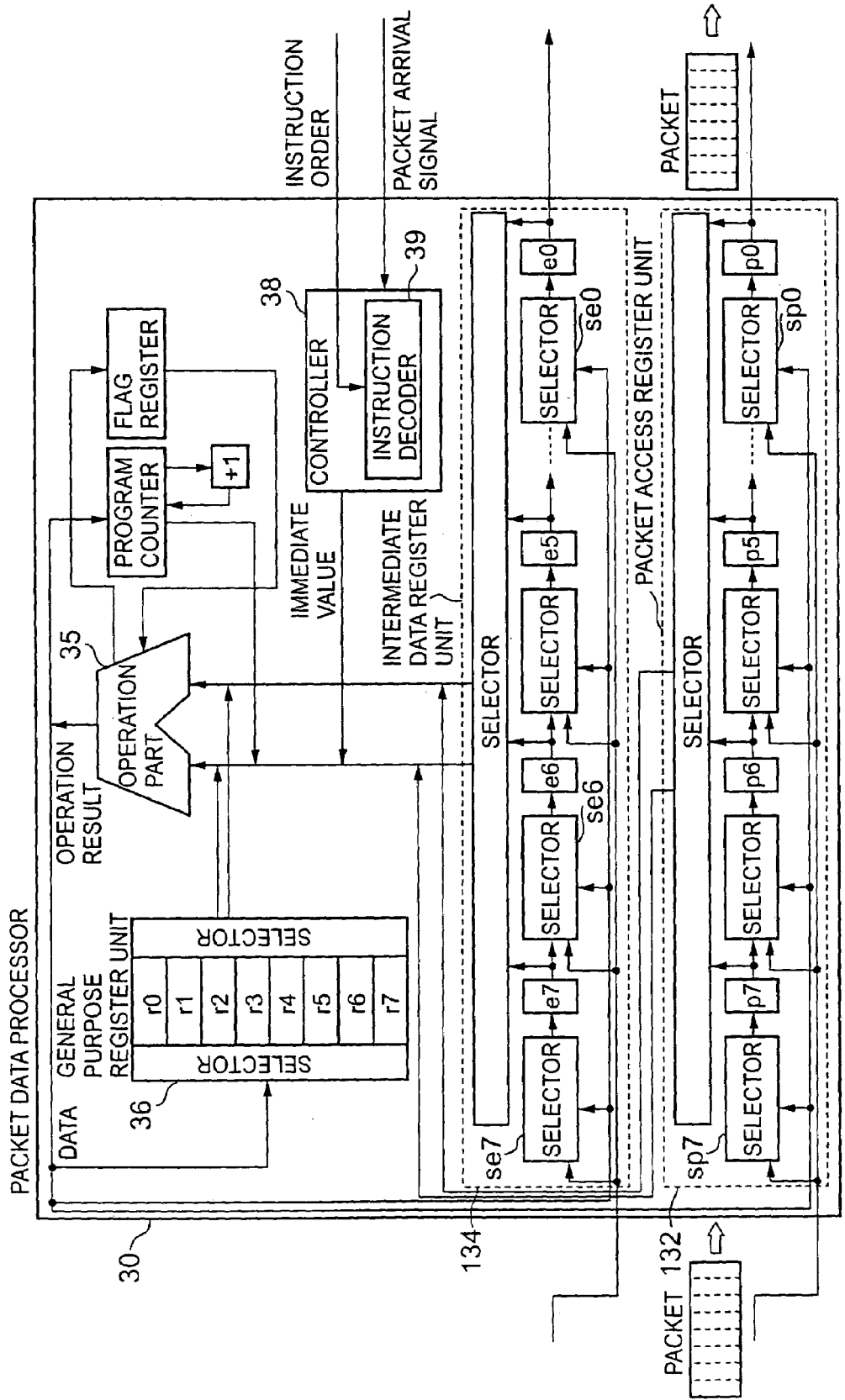
FIG. 14 is a diagram showing a forth embodiment of the packet data processor according to the present invention.
Figure 15:
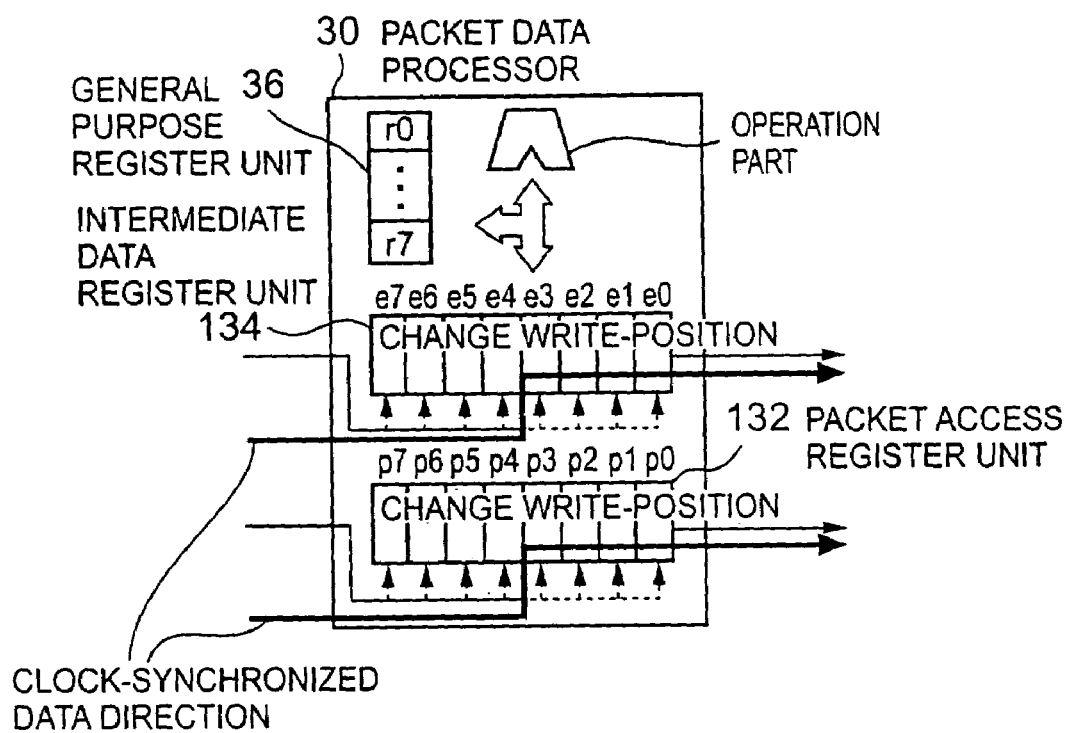
FIG. 15 is a diagram showing a principle operation of the write-position changing mechanism in the packet data processor in FIG. 14.

FIG. 14 is a diagram showing a fourth embodiment of the packet data processor according to the present invention. The packet data processor 30 additionally includes a write-position changing mechanism for changing a write-position where data is written from outside of the packet data processor 30. FIG. 15 is a diagram showing a principle operation of the write-position changing mechanism in the packet data processor 30 in FIG. 14. In the write-position changing mechanism as shown in FIG. 15, the write-position, which indicates a position in a packet access register unit 132 or an intermediate data register unit 134 to write data from the outside of the packet data processor 30, can be changed to any one of registers p7 through p0 in the packet access register unit 132 or any one of registers e7 through e0 in the intermediate data register unit 134.

For example, in FIG. 15, in the packet data processor 30, data are written to the register p4 of the packet access register unit 132 and the register e4 of the intermediate data register unit 134 from the outside of the packet data processor 30, are passed through the registers p3, p2 and p1 and the registers e3, e2 and e1 by synchronizing the clock, and is output from the register p0 of the packet access register unit 132 and the register e0 of the intermediate data register 134.

For example, the controller 38 in FIG. 14 additionally includes a register for maintaining a select signal which is sent to selectors sp0 through sp7 for the packet access register unit 232 and selectors se0 through se7 of the intermediate data register unit 234. In addition, before the write-position changing mechanism is activated, the select signal is written and maintained in the register by an outside apparatus managing processor or a like as setting information.

In the write-position changing mechanism, for example, the packet data processor 30 inputs the packet data to each selector of sp0 through sp7 provided between the registers p7 through p0 and each selector of sp0 through sp7 determines based on the setting information of the select signal whether the packet data is sent to a next register or data in a previous register is sent to a following register.

A mechanism for writing data from the intermediate data register unit 134 is the same as the write-position changing mechanism. The selectors sp0 through sp7 and se0 through se7 operating as mentioned above are provided and the write-position changing mechanism is provided to change the write-position. Based on the information of the packet process executed by the packet data processor 30, the write-position is changed. Therefore, it is possible to reduce a maintaining time to maintain each portion of the packet data in the packet data processor 30.

For example, in a case in which the packet data processor 30A in FIG. 12 is used as the packet data processor 30 in FIG. 14, in the IP header length check executed by the packet data processor 30A, just the register p7 of the packet access register unit 32 is referred to by the order number 5 of the instruction order. Thus, by changing the write-position, one register of the packet access register unit 32 is used for the packet data to pass through the packet processor 30. Consequently, it is possible to reduce the maintaining time that the packet data maintains in the packet data processor 30. However, this case depends on the information of the packet process. In the TTL decrease operation executed by the packet data processor 30C in FIG. 12, the register p7 of the packet access register 32 is referred to by the order number 7 of the order instruction and data is written in the register p0 of the packet access register unit 32 by the order number 13 of the instruction order. Thus, it is impossible to reduce a simultaneous accessible range of the packet data by changing the write-position. Hence, the device designer predetermines the write-position based on the information of the packet process that the packet data processor 30 executes.

Figure 16:
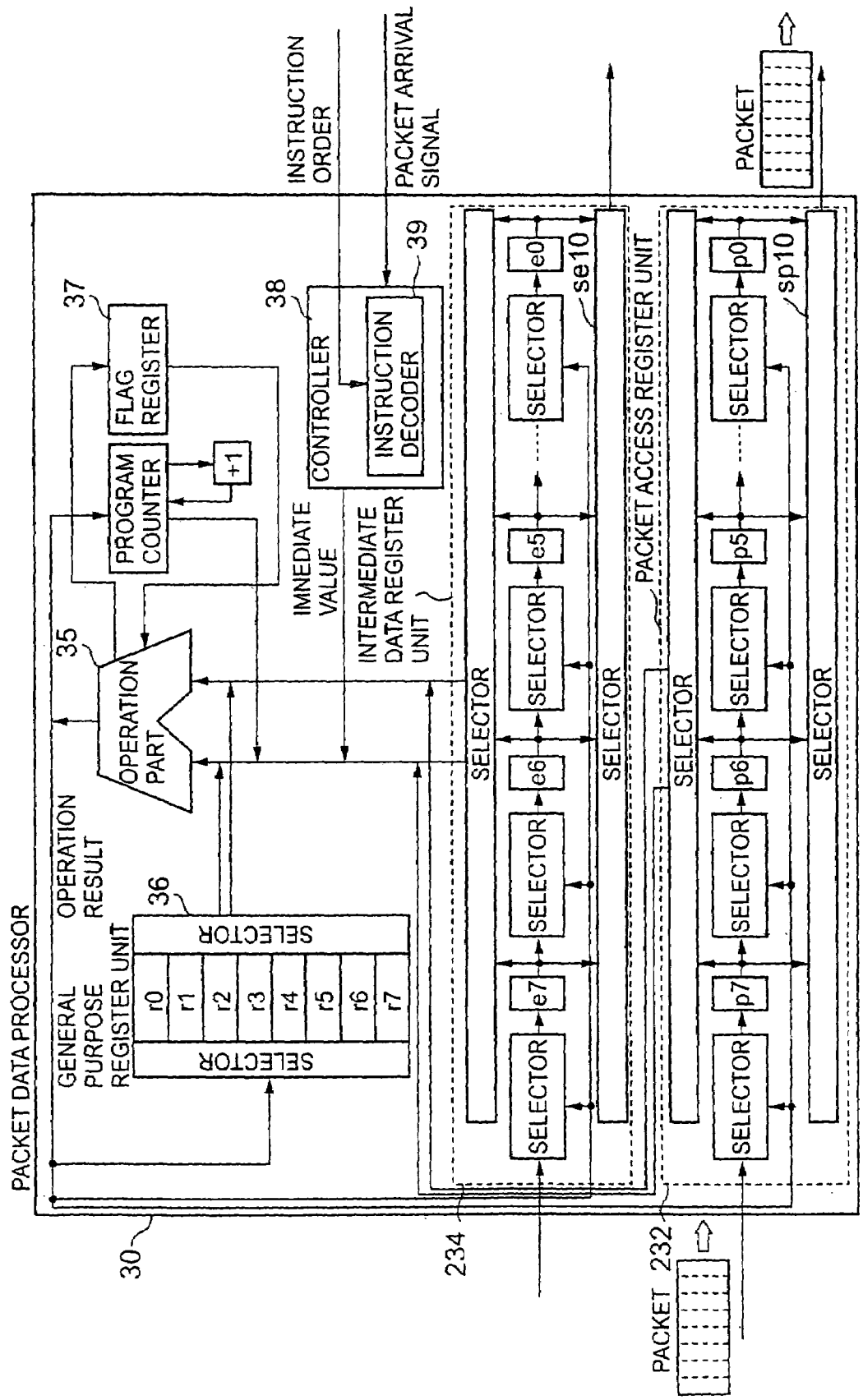
FIG. 16 is a diagram showing a fifth embodiment of the packet data processor according to the present invention.
Figure 17:
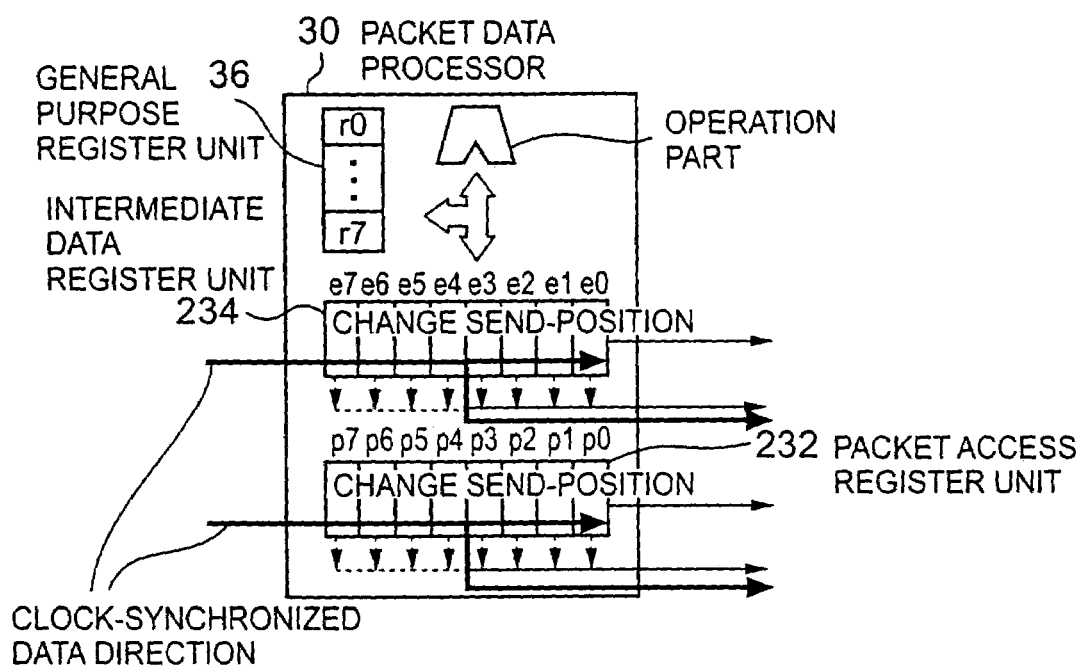
FIG. 17 is a diagram showing a principle operation of the send-position changing mechanism in the packet data processor in FIG. 16.

FIG. 16 is a diagram showing a fifth embodiment of the packet data processor according to the present invention. The packet data processor 30 additionally includes a send-position changing mechanism for changing a send-position where data is sent to the outside of the packet data processor 30. FIG. 17 is a diagram showing a principle operation of the send-position changing mechanism in the packet data processor 30 in FIG. 16. In the send-position changing mechanism as shown in FIG. 17, the send-position, which indicates a position in a packet access register unit 232 or an intermediate data register unit 234 to send data to the outside of the packet data processor 30, can be changed to any one of the registers p7 through p0 in the packet access register unit 232 or any one of the registers e7 through e0 in the intermediate data register unit 234. It should be noted that the packet access register unit 232 includes the same registers p7 through p0 as the packet access register unit 132 and the intermediate data register unit 234 includes the same registers e7 through e0.

For example, in FIG. 17, in the packet data processor 30, data are written to the register p7 of the packet access register unit 232 and the register e7 of the intermediate data register unit 234 from the outside of the packet data processor 30, are passed through the registers p6 and p5 and the registers e6 and e5 by synchronizing the clock, and output from the register p4 of the packet access register unit 232 and the register e4 of the intermediate data register 234. In addition, in the send-position changing mechanism, data, which the packet access register 232 already input, are passed through the registers e3, e2, e1 and e0 and the registers p3, p2, p1 and p0 in sequence. The packet data processor 30 can read the data passing through the register e3, e2, e1 and e0 or the register p3, p2, p1 and p0 but do not transmit the data to the outside of the packet data processor 30.

For example, the controller 38 in FIG. 16 additionally includes a register for maintaining a select signal which is sent to a selector sp10 of the packet access register unit 232 and a selector se10 of the intermediate data register unit 234. In addition, before the send-position changing mechanism is activated, the select signal is written and maintained in the register by an outside apparatus managing processor or a like as setting information.

In the send-position changing mechanism, for example, the entire packet data stored in the registers p0 through p7 of the packet access register unit 232 are input the single selector sp10 and the selector sp10 selects which data section is sent to the outside of the packet data processor 30. The data are shifted between the registers p0 through p7, independent of the selector sp10. It is possible for the packet data processor 30 to read the data, which are supplied to a next process, from any one of the registers p0 through p7.

A mechanism for sending data from the intermediate data register unit 234 is the same as the send-position changing mechanism. The selectors sp10 and se0 operating as mentioned above are provided and the send-position changing mechanism is provided to change the send-position.

By the send-position changing mechanism, based on the information of the packet process executed by the packet data processor 30, the send-position is changed. Therefore, it is possible to reduce a maintaining time to maintain each portion of the packet data in the packet data processor 30. Moreover, the data, which are supplied to the next process, still remain at positions shifted after the send-position in the packet access register unit 232. Therefore, it is possible to refer to the data from the packet access register unit 232.

In the packet data processor 30 including the write-position changing mechanism in FIG. 14, the packet data processor 30 executes a process referring to the packet data at the constant clock pulse number after the packet data are input to the packet data processor 30. In this case, even if it can not be possible to reduce the maintaining time for maintaining the portions of the packet data in the packet data processor 30, the data, which is sent out for the next process, can be referred to in the third embodiment of the packet data processor 30 in FIG. 16. Thus, it is possible to reduce the maintaining time.

As mentioned above, according to the present invention, while the packet data processor 30 stores the packet data directly from the outside of the packet data processor 30 to the packet access register unit 32, 132 or 232 and the intermediate data register unit 34, 134 or 234, which are provided in the packet data processor 30, the stored packet data are sequentially shifted in the packet access register unit 32, 132 or 232 and the intermediate data register unit 34, 134 or 234. A certain range of the packet data can be referred. Consequently, it is possible to complete the packet process by a small number of registers. Also, it is possible to eliminate the conventional disadvantage related to the process for reading or writing the packet data from or to the memory during the data transmission.

By using registers, instead of the memory, the present invention can eliminate the conventional disadvantage related to the process for reading or writing the packet data and realize the high speed packet process. In addition, according to the present invention, in the data transmission, the mechanism in which the data stored in the registers are sequentially shifted is provided and the packet data processor 30 executes the instructions by synchronizing the data transmission. Therefore, the packet process can be executed in accordance with the instruction order. Also, the packet process can be highly flexible so that it is possible to easily modify the packet process and be executed at high speed.

Moreover, the intermediate data register unit 34, 134 or 234 for maintaining and transmitting the process result of the packet data is provided in the packet data processor 30 and synchronizes with the packet access register unit 32, 132 or 232. Therefore, a special mechanism for showing locations storing the packet data and the process result of the packet data is not required.

Furthermore, when the plurality of the packet data processor is connected in series and the packet process is conducted in the pipeline method, by providing the global register unit 60 to share data between the packet data processors, it is possible to optimize the packet process between the packet data processors.

In addition, in the present invention, the write-position changing mechanism, which changes the register where the packet data is written, is provided in the packet data processor 30. Therefore, it is possible to reduce the maintaining time for maintaining the packet data in the packet data processor 30.

Also, by providing the send-position changing mechanism, which changes the register where the packet data is sent out, it is possible to reduce the maintaining time for maintaining the packet data in the packet data processor 30 and to still refer to the data, which are sent out to the next process. Consequently, even if the packet data processor 30 implementing the write-position changing mechanism can not reduce the maintaining time for maintaining the packet data in the packet data processor, the sent-position changing mechanism can reduce the maintaining time.

The present invention is not limited to the specifically disclosed embodiments, variations and modifications, and other variations and modifications may be made without departing from the scope of the present invention.

The present application is based on Japanese Priority Application No. 11-158514 filed on Jun. 4, 1999, the entire contents of which are hereby incorporated by reference.

What is claimed is:

1. A packet data processing apparatus for processing a packet received from a network by a processor, comprising:
   a packet data access part, which has a plurality of registers and a plurality of selectors arranged in series, shifting the received packet through the plurality of registers toward an outlet in synchronization with a clock,
   wherein:
   the processor processes the received packet while the received packet is being-shifted through the plurality of registers, independently of an instruction order for processing the received packet;
   the processor and the packet data access part are directly connected by a read data line and a write data line;
   the processor reads out or writes data from or to the packet data access part by synchronizing the cycle time of the processor by the read data line and the write data line; and
   each of the plurality of registers of the packet data access part is connected to a neighbor register via one of the plurality of selectors which selects write data from between the processor via the write data line and the neighbor register, so as to enable the processor to process the received packet, instead of fully shifting the received packet through the entire series of registers.

2. The packet data processing apparatus as claimed in claim 1, further comprising:
   an intermediate data maintaining part, which has a plurality of registers arranged in series, sequentially shifting intermediate data showing a process result of the received packet through the plurality of registers toward the outlet in synchronization with the clock.

3. The packet data processing apparatus as claimed in claim 1, further comprising a search table, wherein said processor searches the search table by using data of the received packet, and retrieves information corresponding to the data of the received packet.

4. The packet data processing apparatus as claimed in claim 1, wherein said processor processes the received packet being shifted by said packet data access part in accordance with a set of instructions.

5. The packet data processing apparatus as claimed in claim 4, wherein the set of sequential instructions is for executing a checksum calculation for the received packet.

6. The packet data processing apparatus as claimed in claim 4, wherein the set of sequential instructions is for executing a Time-To-Live calculation for the received packet.

7. The packet data processing apparatus as claimed in claim 1, further comprising a search table, wherein said processor searches said search table for transmission interface information by using a destination address stored in the received packet, and retrieves the transmission interface information corresponding to the destination address, in accordance with a set of instructions for forwarding the received packet to the destination address while the received packet is shifted by said packet data access part.

8. A packet relay apparatus for forwarding a packet received from a network, comprising:
   a plurality of processors being connected in series in that the packet sequentially passes through the plurality of processors, each processor comprising:
   a packet data access part, which has a plurality of registers and a plurality of selectors arranged in series, shifting the received packet through the plurality of registers toward an outlet in synchronization with a clock, wherein:
   the processor processes the received packet while the received packet is being-shifted through the plurality of registers, independently of an instruction order for processing the received packet;
   the processor and the packet data access part are directly connected by a read data line and a write data line;
   the processor reads out or writes data from or to the packet data access part by synchronizing the cycle time of the processor by the read data line and the write data line; and
   each of the plurality of registers of the packet data access part is connected to a neighbor register via one of the plurality of selectors which selects write data from between the processor via the write data line and the neighbor register, so as to enable the processor to process the received packet, instead of fully shifting the received packet through the entire series of registers.

9. The packet relay apparatus as claimed in claim 8, wherein each processor independently processes the received packet being shifted by said packet data access part ins accordance with a different instruction order.

10. The packet relay apparatus as claimed in claim 8, further comprising:
   a shared data access part, which has at least one register to be shared, capable of being accessed by the plurality of processors connected in series.

11. The packet data processing apparatus as claimed in claim 1, further comprising:
   a write-position changing part changing a write-position of said plurality of registers of the packet data access part where the write-position defines an inlet point at which said packet data access part received the packet from an exterior thereof.

12. The packet data processing apparatus as claimed in claim 1, further comprising:
   a send-position changing part changing a send-position of said plurality of registers of the packet data access part where the send-position defines an outlet point at which said packet data access point sends the packet to an exterior thereof.

* * * * *